(12) United States Patent
Birsak et al.

(10) Patent No.: US 7,781,537 B2
(45) Date of Patent: *Aug. 24, 2010

(54) FUNCTIONALIZED POLY(ARYLENE ETHER) COMPOSITION AND METHOD

(75) Inventors: Joop Birsak, Halsteren (NL); Herbert Shin-I Chao, Paoli, PA (US); Bryan Duffey, Ballston Spa, NY (US); Amy Rene Freshour, Putte (NL); Hugo Gerard Edward Ingelbrecht, Essen (BE); Qiwei Liu, Watervliet, NY (US); Michael Joseph O'Brien, Clifton Park, NY (US); Prameela Susarla, Clifton Park, NY (US); Michael Vallance, Loudonville, NY (US); Kenneth Paul Zarnoch, Scotia, NY (US)

(73) Assignee: Sabic Innovative Plastics IP B.V. (NL)

(*) Notice: Subject to any disclaimer, the term of this patent is extended or adjusted under 35 U.S.C. 154(b) by 436 days.

This patent is subject to a terminal disclaimer.

(21) Appl. No.: 11/877,817

(22) Filed: Oct. 24, 2007

(65) Prior Publication Data

US 2008/0051522 A1 Feb. 28, 2008

Related U.S. Application Data

(63) Continuation of application No. 10/920,744, filed on Aug. 18, 2004, now Pat. No. 7,329,708.

(51) Int. Cl.
*C08L 71/12* (2006.01)
(52) U.S. Cl. .................. 525/391; 525/390; 526/319; 526/323.1; 526/324; 526/328; 526/329.2; 528/205; 528/219
(58) Field of Classification Search .................. None
See application file for complete search history.

(56) References Cited

U.S. PATENT DOCUMENTS

| | | |
|---|---|---|
| 3,306,874 A | 2/1967 | Hay |
| 3,375,228 A | 3/1968 | Holoch et al. |
| 3,496,236 A | 2/1970 | Cooper et al. |
| 3,630,995 A | 12/1971 | Modan |
| 4,048,143 A | 9/1977 | Hay et al. |
| 4,140,675 A | 2/1979 | White |
| 4,148,843 A | 4/1979 | Goossens |
| 4,165,422 A | 8/1979 | White et al. |
| 4,234,706 A | 11/1980 | White |
| 4,521,584 A | 6/1985 | Heitz et al. |
| 4,562,243 A | 12/1985 | Percec |
| 4,634,742 A | 1/1987 | Percec |
| 4,663,402 A | 5/1987 | Percec et al. |
| 4,665,137 A | 5/1987 | Percec et al. |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,806,601 A | 2/1989 | Percec |
| 4,806,602 A | 2/1989 | White et al. |
| 4,873,371 A | 10/1989 | Yeager et al. |
| 4,923,932 A | 5/1990 | Katayose et al. |
| 5,021,543 A | 6/1991 | Mayska et al. |
| 5,053,555 A | 10/1991 | Yeager et al. |
| 5,071,922 A | 12/1991 | Nelissen et al. |
| 5,079,268 A | 1/1992 | Nelissen et al. |
| 5,089,343 A | 2/1992 | Colborn et al. |
| 5,091,480 A | 2/1992 | Percec et al. |
| 5,171,761 A | 12/1992 | Penco et al. |
| 5,218,030 A | 6/1993 | Katayose et al. |
| 5,219,951 A | 6/1993 | Nelissen et al. |
| 5,304,600 A | 4/1994 | Nelissen et al. |
| 5,310,820 A | 5/1994 | Nelissen et al. |
| 5,338,796 A | 8/1994 | Vianello et al. |
| 5,352,745 A | 10/1994 | Katayose et al. |
| 5,407,972 A | 4/1995 | Smith et al. |
| 5,578,672 A | 11/1996 | Beall et al. |
| 5,612,425 A | 3/1997 | Weber et al. |
| 5,834,565 A | 11/1998 | Tracy et al. |
| 5,880,221 A | 3/1999 | Liska et al. |
| 5,965,663 A | 10/1999 | Hayase |
| 6,165,309 A | 12/2000 | Burnell et al. |
| 6,306,963 B1 | 10/2001 | Lane et al. |

(Continued)

FOREIGN PATENT DOCUMENTS

DE 3117514 A1 5/1981

(Continued)

OTHER PUBLICATIONS

W. Risse et al., "Preparation and Characterization of Poly[oxy(2,6-dimethyl-1,4-phenylene)] with Functional End Groups", Makromol. Chem. 186, 1835-1853 (1985).

(Continued)

*Primary Examiner*—Marc S Zimmer
(74) *Attorney, Agent, or Firm*—Cantor Colburn LLP

(57) ABSTRACT

A curable composition includes an olefinically unsaturated monomer and a poly(arylene ether) having two polymerizable groups and an intrinsic viscosity of about 0.05 to about 0.30 deciliters per gram. The composition exhibits an improved combination of high flow during molding and high post-cure stiffness and impact strength. The composition is particularly useful for fabricating plastic-packaged electronic devices.

22 Claims, 5 Drawing Sheets

U.S. PATENT DOCUMENTS

| | | | |
|---|---|---|---|
| 6,307,010 | B1 | 10/2001 | Braat et al. |
| 6,352,782 | B2 | 3/2002 | Yeager et al. |
| 6,384,176 | B1 | 5/2002 | Braat et al. |
| 6,407,200 | B1 | 6/2002 | Singh et al. |
| 6,465,368 | B2 | 10/2002 | Inoue et al. |
| 6,469,124 | B2 | 10/2002 | Braat et al. |
| 6,521,703 | B2 | 2/2003 | Zarnoch et al. |
| 6,569,982 | B2 | 5/2003 | Hwang et al. |
| 6,617,398 | B2 | 9/2003 | Yeager et al. |
| 6,627,704 | B2 | 9/2003 | Yeager et al. |
| 6,627,708 | B2 | 9/2003 | Braat et al. |
| 6,780,959 | B2 * | 8/2004 | Braat et al. ............ 528/86 |
| 6,794,481 | B2 | 9/2004 | Amagai et al. |
| 6,812,276 | B2 | 11/2004 | Yeager |
| 6,812,676 | B2 | 11/2004 | Tateishi |
| 6,878,781 | B2 | 4/2005 | Zarnoch et al. |
| 6,897,282 | B2 | 5/2005 | Freshour et al. |
| 6,987,157 | B2 | 1/2006 | Clement et al. |
| 7,067,595 | B2 | 6/2006 | Zarnoch et al. |
| 7,071,266 | B2 | 7/2006 | Ishii et al. |
| 7,119,136 | B2 * | 10/2006 | Campbell et al. ........ 524/133 |
| 7,148,296 | B2 | 12/2006 | Zarnoch et al. |
| 7,235,192 | B2 | 6/2007 | Yeager et al. |
| 7,329,708 | B2 * | 2/2008 | Birsak et al. ............ 525/391 |
| 2002/0028337 | A1 | 3/2002 | Yeager et al. |
| 2002/0077447 | A1 | 6/2002 | Hwang et al. |
| 2002/0169256 | A1 | 11/2002 | Merfeld et al. |
| 2002/0173597 | A1 | 11/2002 | Zarnoch et al. |
| 2002/0177027 | A1 | 11/2002 | Yeager et al. |
| 2003/0194562 | A1 | 10/2003 | Ishii et al. |
| 2003/0215588 | A1 | 11/2003 | Yeager et al. |
| 2003/0220460 | A1 * | 11/2003 | Merfeld ............... 526/347.2 |
| 2004/0018319 | A1 | 1/2004 | Walfried et al. |
| 2004/0132941 | A1 | 7/2004 | Ishli et al. |
| 2004/0146692 | A1 | 7/2004 | Inoue et al. |
| 2004/0147715 | A1 | 7/2004 | Ishii et al. |
| 2005/0032979 | A1 | 2/2005 | Yeager |
| 2005/0042466 | A1 | 2/2005 | Ohno et al. |
| 2005/0065241 | A1 | 3/2005 | Ishii et al. |
| 2005/0075462 | A1 | 4/2005 | Zaroch et al. |
| 2005/0075463 | A1 | 4/2005 | Zarnoch et al. |

FOREIGN PATENT DOCUMENTS

| | | |
|---|---|---|
| DE | 4103140 A1 | 2/1991 |
| EP | 0 261 574 B1 | 9/1987 |
| EP | 0 550 209 A2 | 7/1993 |

OTHER PUBLICATIONS

V. Percec et al., "Synthesis of α,ω-bis(2,6-dimethylphenol)-poly(2,6-dimethyl-1,4-phenylene oxide) by Phase Transfer Catalyzed Polymerization of 4-bromo-2,6-dimethylphenol in the Presence of 2,2-di(4-hydroxy-3,5-dimethylphenyl)Propane", Polymer Bulletin 24, 493-500 (1990).
Plastic Additives Handbook, 4$^{th}$ Edition, R. Gachter and H. Muller (eds.), P.P. Klemchuck (assoc. ed.) Hanser Publishers, New York, 1993, pp. 901-948.
S. J. Monte et al., "A New Generation of Age and Water Resistant Reinforced Plastics", Ann. Chem. Tech. Conf. SPI (1980), Ann. Tech. Conf. Reinforced Plastics/Composite Inst. SPI 1979, Section 16E, New Orleans (9 pages).
S. J. Monte et al., "Coupling Composites with Titanate During Extrusion Processing", Modern Plastics, May 1984 (pp. 74,76,78).
L. B. Cohen, "Zircoaluminates Strengthen Premium Ranges of Chemical Coupling Agents", Plastics Engineering, vol. 39, No. 11, Nov. 1983), pp. 29-32.
ASTM Designation: D 790-03 Standard Test Methods for Flexural Properties of Unreinforced and Reinforced Plastics and Electrical Insulating Materials (11 pages).
J. Krijgsman et al., "Synthesis and Characterization of Telechelic Poly(2,6-dimethyl-1,4-phenylene ether) for Copolymerization", Polymer 44 (2003) 7055-7065.
K. P. Chan et al., Macromolecules (1994), vol. 27, pp. 6371 ff.
H. Nava et al., "Functional Polymers and Sequential Copolymers by Phase Transfer Catalysis. 18. Synthesis and Characterization of α,ω-bis(2,6-dimethylphenol)-poly(2,6-dimethyl-1,4-phenylene oxide) and α,ω-bis(vinylbenzyl)-poly(2,6-dimethyl-1,4-phenylene oxide) Oligomers", Journal of Polymer Science: Part A: Polymer Chemistry, vol. 24, 965-990 (1986).
W. Heitz et al., "Synthesis of Telechelic Hard and Soft Segments", Polymer Preprints (American Chemical Society, Division of Polymer Chemistry) (1984), vol. 25, No. 1, pp. 136-137.
Dwain W. White, "Reactions of Poly(phenylene Oxide)s with Quinones. I. The Quinone-Coupling Reaction Between Low-Molecular Weight Poly (2,6-Dimethyl-1,4-Phenylene Oxide) and 3,3',5,5'-Tetramethyl-4,4'-Diphenoquinone", Journal of Polymer Science, Polymer Chemistry Edition, vol. 190, 1367-1383 (1981).
Dwain W. White, "The Synthesis of 4-Hydroxyarylene Ethers by the Equilibration of Phenols with Poly(2,6-dimethyl-1,4-phenylene ether)", Journal of Organic Chemistry, vol. 34, No. 2, Feb. 1969, pp. 297-303.
Arnold Factor, J The High Temperature Degradation of Poly(2,6-dimethyl-1,4-phenylene Ether), Journal of Polymer Science: Part A-1, vol. 7, 363-377 (1969).
C. Pugh et al., "Group Transfer Polymerization of Some Unusual Acrylates and Methacrylates", Polym. Prepr. (Am. Chem. Soc., Div. Polym. Chem.) (1985), vol. 26, No. 2, pp. 303-305.
SEMI G69-0996 Test Method for Measurement of Adhesive Strength Between Leadframes and Molding Compounds (15 pgs).
SEMI G11-88 Recommended Practice for Ram Follower Gel Time and Spiral Flow of Themal Setting Molding Compounds (3 pgs).
JP2004115619; Apr. 15, 2004; Abstract Only (1 page).
JP 60-115609; Jun. 22, 1985; Abstract Only (2 pages).
J.R. Campbell, S.Y. Hobbs, T.J. Shea, and V.H. Watkins, Polymers Engineering and Science, 1990, vol. 30, No. 17, pp. 1056-1062.
A.S. Hay, Polymer Engineering and Science, 1976, vol. 16, No. 1 pp. 1-10.
D.M. White and S.A. Nye, Macromolecules, 1990, vol. 23, pp. 1318-1329.
Hackh's Chemical Dictionary, Third Edition, Edited by Julius Grant, 1944, McGraw-Hill Book Company, Inc., p. 33.
International Search Report; International Application No. PCT/US2005/028602; International Filing Date Nov. 8, 2005; Date of Mailing Nov. 17, 2005 (6 pages).

* cited by examiner

FUNCTIONALIZED POLY(ARYLENE ETHER) COMPOSITION AND METHOD

CROSS REFERENCE TO RELATED APPLICATIONS

This patent application is a continuation of U.S. patent application Ser. No. 10/920,744 filed Aug. 18, 2004, the contents of which are hereby incorporated by reference.

BACKGROUND OF THE INVENTION

Curable compositions including reactively end-capped poly(arylene ether) resins and copolymerizable monomers have been described, for example, in U.S. Pat. No. 5,071,922 to Nelissen et al., and U.S. Pat. Nos. 6,352,782 and 6,627,704 to Yeager et al., as well as U.S. Statutory Invention Registration No. H521 to Fan. The compositions described therein are useful in a wide variety of thermoset applications, but existing formulations lack the balance of properties that is desired for fabricating plastic-packaged electronic devices. In particular, there is a need for improved flow during molding without sacrificing post-cure physical properties such as stiffness and impact strength.

BRIEF DESCRIPTION OF THE INVENTION

A curable composition exhibiting an improved balance of mold flow and post-cure physical properties comprises a difunctionalized poly(arylene ether) having an intrinsic viscosity of about 0.05 to about 0.30 deciliter per gram at 25° C.; and an olefinically unsaturated monomer.

Other embodiments, including a method of preparing the curable composition, a cured composition, and an article comprising the cured composition, are described in detail below.

DETAILED DESCRIPTION OF THE PREFERRED EMBODIMENTS

Figure 1:
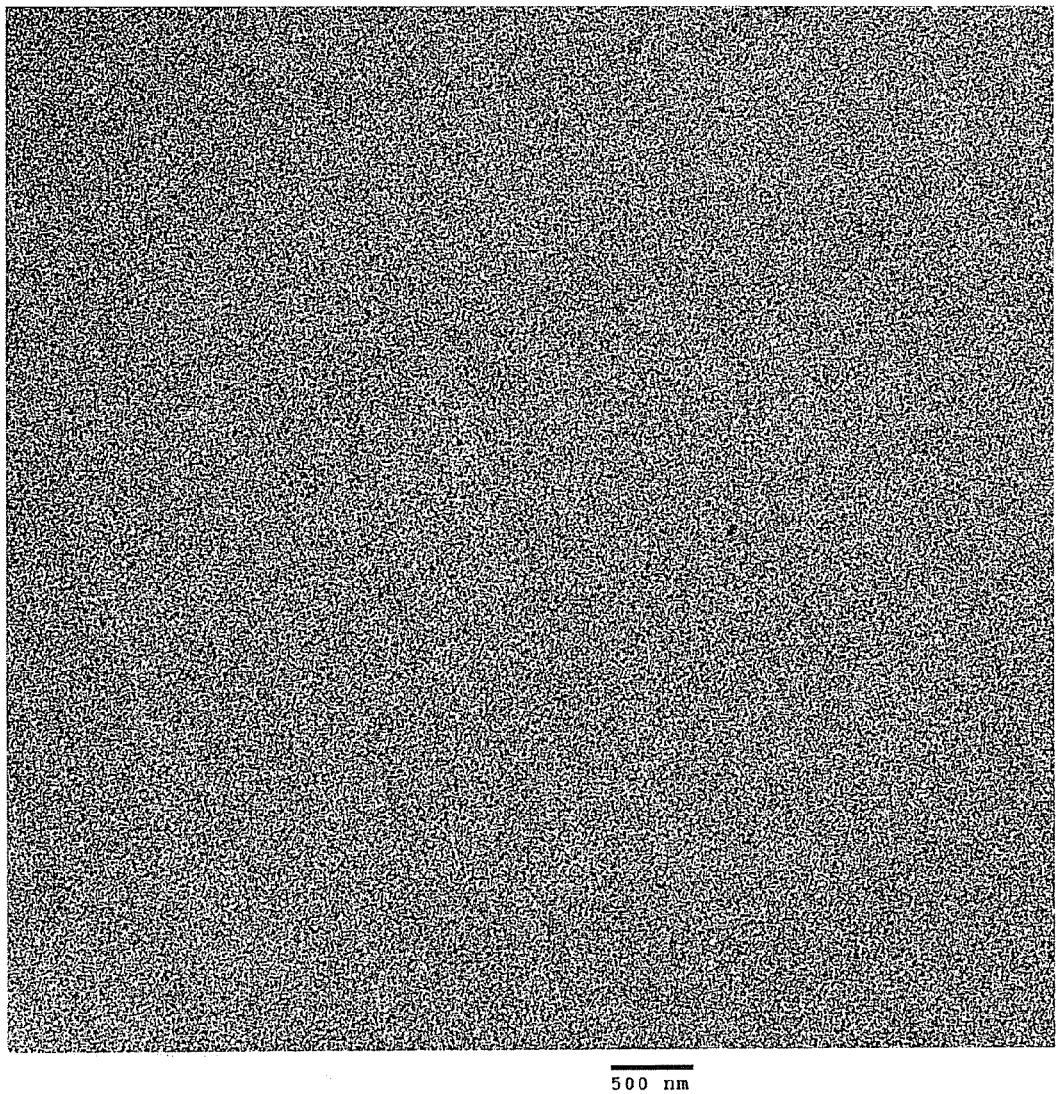
FIG. 1 is a transmission electron micrograph corresponding to Comparative Example 6.

The present inventors conducted extensive research to find a composition that would exhibit the desirable characteristics usually associated with poly(arylene ether)-based thermosets, such as high glass transition temperature, low coefficient of thermal expansion, and low dielectric constant, while exhibiting molding characteristics similar to those of the epoxy thermoset resins currently favored by the marketplace. Early research indicated that the composition cured rapidly, but that it exhibited less than desired flow during the early stages of curing. Extensive experimentation revealed that flow could be improved by reducing the intrinsic viscosity of the functionalized poly(arylene ether), but this change also reduced the stiffness and impact strength of the cured composition. Additional experiments showed, surprisingly, that improved flow can be achieved without sacrificing post-cure physical properties by employing a functionalized poly(arylene ether) of reduced intrinsic viscosity but increased polymerizable functionality. In particular, it has been found that a substantially improved property balance is obtained when the poly(arylene ether) contains two polymerizable groups (i.e., it is a "difunctionalized" poly(arylene ether)) and has an intrinsic viscosity of about 0.05 to about 0.30 deciliter per gram at 25° C.

One embodiment is a curable composition comprising a difunctionalized poly(arylene ether) having an intrinsic viscosity of about 0.05 to about 0.30 deciliter per gram (dL/g) at 25° C., and an olefinically unsaturated monomer. Within the above stated range, the intrinsic viscosity of the difunctionalized poly(arylene ether) may be, more specifically, at least about 0.08 dL/g, even more specifically at least about 0.12 dL/g. Also within the above stated range, the intrinsic viscosity of the difunctionalized poly(arylene ether) may be, more specifically, up to about 0.25 dL/g, even more specifically up to about 0.20 dL/g.

As used herein, a difunctionalized poly(arylene ether) is a poly(arylene ether) having a polymerizable carbon-carbon double bond at each end of the molecule. One method of preparing such molecules is to first prepare a poly(arylene ether) having a hydroxy group at each end of the molecule ("dihydroxy poly(arylene ether)"), then react the dihydroxy poly(arylene ether) with sufficient capping reagent to form polymerizable capping groups at each end of the molecule.

Several approaches to dihydroxy poly(arylene ether) resins are known. First, monohydric and dihydric phenols may be copolymerized as described, for example, in U.S. Pat. Nos. 4,521,584 and 4,677,185 to Heitz et al.; U.S. Pat. No. 5,021,543 to Mayska et al.; U.S. Patent Application Publication No. 2003/0194562 A1 to Ishii et al.; W. Risse et al., Makromolekulare Chemie (1985), volume 186, no. 9, pages 1835-1853; and V. Percec et al., Polymer Bulletin (1990), vol. 24, no. 5, pages 493-500. Second, monohydroxy poly(arylene ether) resins may be reacted with a dihydric phenol in the presence of an oxidant as described, for example, in U.S. U.S. Pat. No. 3,496,236 to Cooper et al., U.S. Pat. No. 5,880,221 to Liska et al., and U.S. Pat. No. 6,569,982 to Hwang et al. Third, monohydroxy poly(arylene ether) resins may be equilibrated with diphenoquinones as described, for example, in U.S. Pat. Nos. 4,140,675 and 4,165,422 and 4,234,706 to White, U.S. Pat. No. 6,307,010 B1 to Braat et al., as well as European Patent Application No. 550,209 A2 to Aycock et al. Fourth, dihydric phenols and dihalophenol sulfones may be copolymerized in the presence of base as described, for example, in U.S. Pat. Nos. 4,562,243 and 4,663,402 and 4,665,137 to Percec, and U.S. Pat. No. 5,965,663 to Hayase, as well as U.S. Statutory Invention Registration No. H521 to Fan. Fifth, a dicarbonyl adduct may be formed from a dihydroxyaromatic compound, the dicarbonyl adduct may be oxidized to the corresponding diester, and the diester may be hydrolyzed to provide the hydroxy-terminated arylene ether; this procedure is described, for example, in U.S. Pat. No. 4,873,371 to Yeager et al. Sixth, monohydroxy poly(arylene ether) resins may be reacted with formaldehyde in the presence of an acid catalyst to form a dihydroxy poly(arylene ether) with an internal methylene group. This method is described, for example, in W. Risse et al., Makromolekulare Chemie (1985), volume 186, no. 9, pages 1835-1853. Seventh, a dihydric phenol may be copolymerized with a 4-halo-2,6-dialkylphenol in the presence of base. This method is described, for example, in W. Risse et al., Makromolekulare Chemie (1985), volume 186, no. 9, pages 1835-1853.

The dihydroxy poly(arylene ether) to may be converted to a difunctionalized poly(arylene ether) using procedures known for adding polymerizable functional groups to poly (arylene ether) resins. Such procedures are sometimes referred to as "capping" the poly(arylene ether), and the reagents therefore are sometimes referred to as "capping reagents". For example, the hydroxy groups of the poly (arylene ether) may be reacted with an acid anhydride as described, for example, in U.S. Pat. No. 3,375,228 to Holoch et al., U.S. Pat. No. 4,165,422 to White, U.S. Pat. No. 5,071, 922 to Nelissen et al., U.S. Pat. No. 6,352,782 B2 to Yeager et al., and 6,384,176 B1 to Braat et al. As another example, the hydroxy groups of the poly(arylene ether) may be reacted with a free acid under conditions suitable for forming an ester linkage as described, for example, in U.S. Patent Application Publication No. 2003/0194562 A1 to Ishii et al. As another example, the hydroxy groups of the poly(arylene ether) may be reacted with an acid halide as described, for example, in U.S. Pat. No. 3,375,228 to Holoch et al. and U.S. Pat. No. 4,165,422 to White. As another example, the hydroxy groups of the poly(arylene ether) may be reacted with a ketene as described, for example, in U.S. Pat. No. 3,375,228 to Holoch et al. As another example, the hydroxy groups of the poly (arylene ether) may be reacted with a haloalkyl group under basic conditions as described, for example, in U.S. Pat. No. 4,562,243 to Percec and U.S. Statutory Invention Registration No. H521 to Fan. Although not all of the above references teach reactions with capping agents containing an ethylenically unsaturated group, their procedures can be adapted for this purpose. For example, the acid halide capping procedure of U.S. Pat. No. 3,375,228 to Holoch et al. and U.S. Pat. No. 4,165,422 to White may be used with acrylic chloride or methacrylic chloride. In one embodiment, the reaction of the capping reagent with the dihydroxy poly(arylene ether) generates a (meth)acrylate capping group. (Meth)acrylic anhydride is a suitable capping reagent for this purpose. It will be understood that the prefix "(meth)acryl-" encompasses both "acryl-" and "methacryl-".

In one embodiment, the difunctionalized poly(arylene ether) has the structure x is at least three; each occurrence of $R^1$ is $C_1$-$C_{12}$ hydrocarbylene; each occurrence of m is 0 or 1; each occurrence of n is 0 or 1; each occurrence of $R^2$-$R^4$ is independently hydrogen or $C_1$-$C_{18}$ hydrocarbyl; and L has the structure

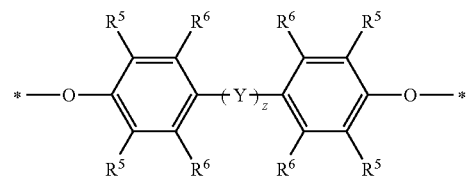

wherein each occurrence of $R^5$ and $R^6$ is independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; z is 0 or 1; and Y has the structure

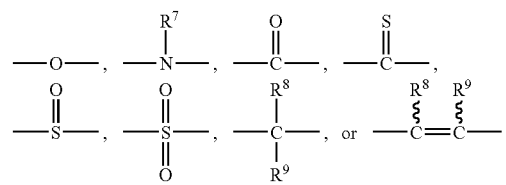

wherein $R^7$, $R^8$, and $R^9$ are each independently hydrogen, $C_1$-$C_{12}$ hydrocarbyl, or the like. In the last substructure above, $R^8$ and $R^9$ may be disposed either cis or trans about the double bond. In one embodiment, the sum of each occurrence of x is at least 4. As used herein, "hydrocarbyl", whether used as a

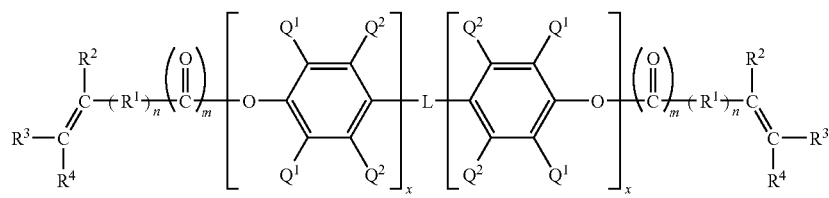

wherein each occurrence of $Q^1$ is independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; each occurrence of $Q^2$ is independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; each occurrence of x is independently 0 to about 100, with the proviso that the sum of each occurrence of word or a prefix, refers to a residue that contains only carbon and hydrogen. The residue may be aliphatic or aromatic, straight-chain, cyclic, bicyclic, branched, saturated, or unsaturated, or a combination thereof. However, when so stated, the hydrocarbyl residue, may contain heteroatoms over and above the carbon and hydrogen members of the substituent residue. Thus, when specifically noted as containing such heteroatoms, the hydrocarbyl residue may also contain carbonyl groups, amino groups, hydroxyl groups, carboxylic acid groups, halogen atoms, or the like, or it may contain heteroatoms within the backbone of the hydrocarbyl residue.

In another embodiment, the difunctionalized poly(arylene ether) has the structure

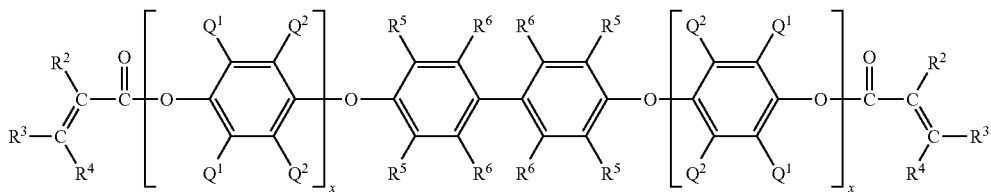

wherein $Q^1$ is methyl; each occurrence of $Q^2$ is independently hydrogen or methyl; each occurrence of $R^2$ is independently hydrogen or methyl; $R^3$ and $R^4$ are hydrogen; each occurrence of $R^5$ and $R^6$ is independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; and each occurrence of x is 1 to about 100. In one embodiment, the sum of each occurrence of x is at least 4.

In another embodiment, the difunctionalized poly(arylene ether) has the structure

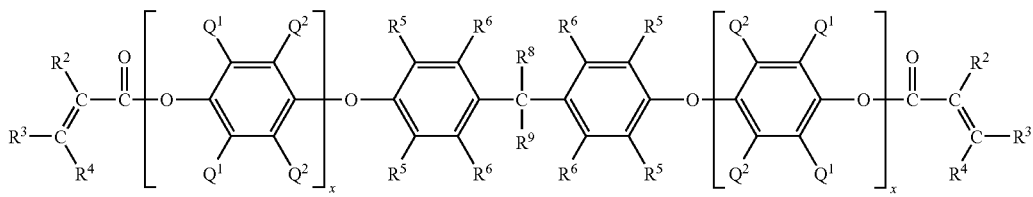

wherein $Q^1$ is methyl; each occurrence of $Q^2$ is independently hydrogen or methyl; each occurrence of $R^2$ is independently hydrogen or methyl; $R^3$ and $R^4$ are hydrogen; each occurrence of $R^5$ and $R^6$ is independently hydrogen, halogen, primary or secondary $C_1$-$C_{12}$ allyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; $R^8$ and $R^9$ are independently hydrogen or $C_1$-$C_6$ hydrocarbyl, or the like; and each occurrence of x is 1 to about 100.

In another embodiment, the difunctionalized poly(arylene ether) has the structure wherein each occurrence of x is 1 to about 100, and z is 0 or 1.

As discussed above, various synthetic methods may be used to prepare the difunctionalized poly(arylene ether). In one embodiment, the difunctionalized poly(arylene ether) is the product of a process comprising oxidatively polymerizing a monohydric phenol in the presence of a catalyst under conditions suitable to form a corresponding poly(arylene ether) and a corresponding diphenoquinone; separating the poly(arylene ether) and the diphenoquinone from the catalyst; equilibrating the poly(arylene ether) and the diphenoquinone to form a poly(arylene ether) having two terminal hydroxy groups; and reacting the poly(arylene ether) having two terminal hydroxy groups with a capping agent to form the difunctionalized poly(arylene ether). An illustrative example of a corresponding poly(arylene ether) is poly(2,6-dimethyl-1,4-phenylene ether) prepared from oxidative polymerization of 2,6-dimethylphenol. An illustrative example of a corresponding diphenoquinone is 3,3',5,5'-tetramethyl-4,4'-diphenoquinone formed by oxidation of 2,6-dimethylphenol.

In another embodiment, the difunctionalized poly(arylene ether) is the product of oxidative copolymerization of a monohydric phenol and a dihydric phenol. Suitable monohydric phenols generally have the structure

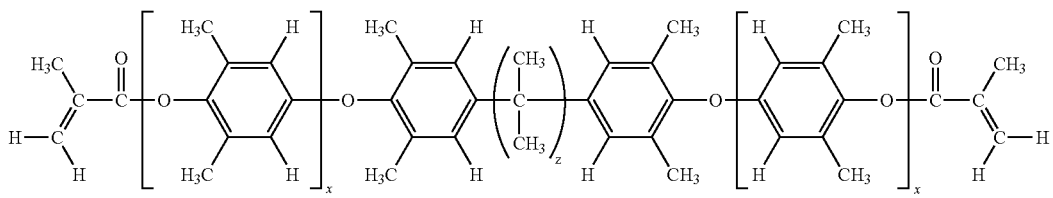

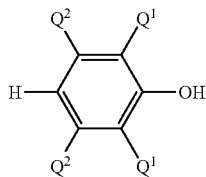

wherein $Q^1$ is halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbyloxy, $C_2$-$C_{12}$ halohydrocarbyloxy wherein at least two carbon atoms separate the halogen and oxygen atoms, or the like; and $Q^2$ is hydrogen, halogen, primary or secondary $C_1$-$C_{12}$ allyl, $C_2$-$C_{12}$ alkenyl, $C_2$-$C_{12}$ alkynyl, $C_1$aminoalkyl, $C_1$-$C_{12}$ hydroxyalkyl, phenyl, $C_1$-$C_{12}$ haloalkyl, $C_1$-$C_{12}$ aminoalkyl, $C_1$-C hydrocarbyloxy, $C_2$-$C_{12}$ halohydrocarbyloxy wherein at least two carbon atoms separate the halogen and oxygen atoms, or the like. Many specific monohydric phenols are described, for example, in U.S. Pat. No. 3,306,875 to Hay. In one embodiment, the monohydric phenol is 2,6-dimethylphenol, 2,3,6-trimethylphenol, or a mixture thereof.

Suitable dihydric phenols generally have the structure

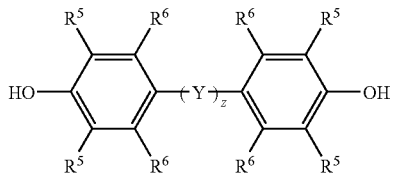

wherein each occurrence of $R^5$ and $R^6$ is independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, $C_2$-$C_{12}$ halohydrocarbyloxy wherein at least two carbon atoms separate the halogen and oxygen atoms, or the like; z is 0 or 1; and Y has the structure

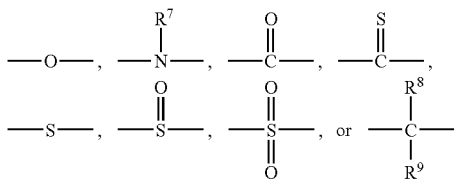

wherein $R^7$, $R^8$, and $R^9$ are each independently hydrogen, $C_1$-$C_{12}$ hydrocarbyl, or the like. Specific suitable dihydric phenols include, for example, 3,3',5,5'-tetramethyl-4,4'-biphenol, 1,1-bis(4-hydroxyphenyl)methane, 1,1-bis(4-hydroxyphenyl)ethane, 2,2-bis(4-hydroxyphenyl)propane ("bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)-n-butane, bis(4-hydroxyphenyl)phenylmethane, 2,2-bis(4-hydroxy-1-methylphenyl)propane, 1,1-bis(4-hydroxy-t-butylphenyl)propane, bis (hydroxyaryl) alkanes such as 2,2-bis(4-hydroxy-2,6-dimethylphenyl)propane ("tetramethyl bisphenol A" or "TMBPA") 2,2-bis(4-hydroxy-3-bromophenyl)propane, 1,1-bis(4-hydroxyphenyl)cyclopentane, bis(hydroxyaryl)cycloalkanes such as 1,1-bis(4-hydroxyphenyl)cyclohexane, and the like, and mixtures thereof.

In one embodiment, the difunctionalized poly(arylene ether) is prepared by a method comprising isolation by devolatilization extrusion. Suitable procedures for devolatilization extrusion are described, for example, in U.S. Pat. No. 6,384,176 B1 to Braat et al. In another embodiment, the difunctionalized poly(arylene ether) has less than 100 parts per million (ppm) of residual terminal —OH groups. Preparative procedures described in the working examples below are capable of producing difunctionalized poly(arylene ether) resin meeting this limitation. Preparative procedures described in the working examples below are capable of producing difunctionalized poly(arylene ether) resin meeting these limitations.

In one embodiment, the difunctionalized poly(arylene ether) has a number average molecular weight of about 1,000 to about 10,000 atomic mass units (AMU), with the provisos that less than 10 weight percent of the difunctionalized poly (arylene ether) has a number average molecular weight less than about 500 AMU, and less than 25 weight percent of the difunctionalized poly(arylene ether) has a number average molecular weight less than about 1,000 AMU. In another embodiment, the difunctionalized poly(arylene ether) has a number average molecular weight of at least about 10,000 AMU, with the provisos that less than 2 weight percent of the difunctionalized poly(arylene ether) has a number average molecular weight less than about 500 AMU, and less than 5 weight percent, preferably less than 1 weight percent, of the difunctionalized poly(arylene ether) has a number average molecular weight less than about 1,000 AMU.

In one embodiment, the difunctionalized poly(arylene ether) may have one or more of the following properties: a number average molecular weight less than 5,000 AMU, less than 1 weight percent of polymer having a molecular weight less than 500 AMU, less than 5 weight percent of polymer having a molecular weight greater than 30,000 AMU, at least 200 micromoles per gram of "vinyl" (i.e., carbon-carbon double bond) functionality, an acid number less than 1 milligrams KOH per gram, and a decomposition onset temperature greater than 450° C. Preparative procedures described in the working examples below are capable of producing difunctionalized poly(arylene ether) resin meeting these limitations.

The curable composition comprises about 5 to about 90 parts by weight of the difunctionalized poly(arylene ether) per 100 parts by weight total of the difunctionalized poly (arylene ether) and the olefinically unsaturated monomer. Within this range, the amount of the difunctionalized poly (arylene ether) resin may specifically be at least about 10 parts by weight, more specifically at least about 15 parts by weight. Also within this range, the amount of the difunctionalized poly(arylene ether) resin may specifically be up to about 80 parts by weight, more specifically up to about 60 parts by weight, still more specifically up to about 50 parts by weight.

In addition to the difunctionalized poly(arylene ether), the curable composition comprises an olefinically unsaturated monomer. The olefinically unsaturated monomer is herein defined as a polymerizable monomer comprising a carbon-carbon double bound. Suitable olefinically unsaturated monomers include, for example, alkenyl aromatic monomers, allylic monomers, acryloyl monomers, vinyl ethers, maleimides, and the like, and mixtures thereof.

The alkenyl aromatic monomer may have the formula

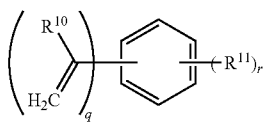

wherein each occurrence of $R^{10}$ is independently hydrogen or $C_1$-$C_{18}$ hydrocarbyl; each occurrence of $R^{11}$ is independently halogen, $C_1$-$C_{12}$ alkyl, $C_1$-$C_{12}$ alkoxyl, or $C_6$-$C_{18}$ aryl; q is 1 to 4; and r is 0 to 5. Unspecified positions on the aromatic ring are substituted with hydrogen atoms. Suitable alkenyl aromatic monomers include, for example, styrene, α-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, styrenes having from 1 to 5 halogen substituents on the aromatic ring, and the like, and combinations thereof. In on embodiment, the alkenyl aromatic monomer is styrene.

The olefinically unsaturated monomer may be an allylic monomer. An allylic monomer is an organic compound comprising at least one allyl (—$CH_2$—CH=$CH_2$) group. In one embodiment, the allylic monomer comprises at least two allyl groups. In another embodiment, the allylic monomer comprises at least three allyl groups. Suitable allylic monomers include, for example, diallyl phthalate, diallyl isophthalate, triallyl mellitate, triallyl mesate, triallyl benzenes, triallyl cyanurate, triallyl isocyanurate, mixtures thereof, partial polymerization products prepared therefrom, and the like, and mixtures thereof.

The olefinically unsaturated monomer may be an acryloyl monomer. An acryloyl monomer is a compound comprising at least one acryloyl moiety having the structure

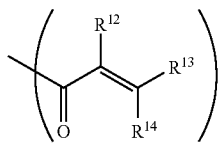

wherein $R^{12}$-$R^{14}$ are each independently hydrogen, $C_1$-$C_{12}$ hydrocarbyl, $C_2$-$C_{18}$ hydrocarbyloxycarbonyl, nitrile, formyl, carboxylic acid, imidate, thiocarboxylic acid, or the like. In one embodiment, the acryloyl monomer comprises at least two acryloyl moieties. In another embodiment, the acryloyl monomer comprises at least three acryloyl moieties. Suitable acryloyl monomers include, for example, trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl(meth)acrylate, methyl(meth)acrylate, methacryloxypropyl trimethoxysilane, ethoxylated (2) bisphenol A di(meth)acrylate, and the like, and mixtures thereof. It will be understood that the number following the ethoxylated term refers to the average number of ethoxy groups in the ethoxylate chain attached to each oxygen of bisphenol A. In one embodiment, the acryloyl monomer comprises at least two acryloyl moieties. In another embodiment, the acryloyl monomer comprises at least three acryloyl moieties.

The olefinically unsaturated monomer may be a vinyl ether. Vinyl ethers are compounds comprising at least one vinyl ether (—O—CH=$CH_2$) group. In one embodiment the vinyl ether contains at least two vinyl ether groups. In another embodiment, the vinyl ether contains at least three vinyl ether groups. Suitable vinyl ethers include, for example, 1,2-ethylene glycol divinyl ether, 1,3-propanediol divinyl ether, 1,4-butanediol divinyl ether, triethyleneglycol divinyl ether, 1,4-cyclohexanedimethanol divinyl ether, ethyl vinyl ether, n-butyl vinyl ether, lauryl vinyl ether, 2-chloroethyl vinyl ether, and the like, and mixtures thereof.

The olefinically unsaturated monomer may be a maleimide. A maleimide is a compound comprising at least one moiety having the structure

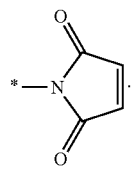

Suitable maleimides include, for example, N-phenylmaleimide, 1,4-phenylene-bis-methylene-α,α'-bismaleimide, 2,2-bis(4-phenoxyphenyl)-N,N'-bismaleimide, N,N'-phenylene bismaleimide, N,N'-hexamethylene bismaleimide, N-N'-diphenyl methane bismaleimide, N,N'-oxy-di-p-phenylene bismaleimide, N,N'-4,4'-benzophenone bismaleimide, N,N'-p-diphenylsulfone bismaleimide, N,N'-(3,3'-dimethyl)methylene-di-p-phenylene bismaleimide, poly(phenylmethylene) polymaleimide, bis(4-phenoxyphenyl)sulfone-N,N'-bismaleimide, 1,4-bis(4-phenoxy)benzene-N,N'-bismaleimide, 1,3-bis(4-phenoxy)benzene-N,N'-bismaleimide, 1,3-bis(3-phenoxy)benzene-N,N'-bismaleimide, and the like, and mixtures thereof.

The composition may generally comprise about 10 to about 95 parts by weight of the olefinically unsaturated monomer per 100 parts by weight total of the difunctionalized poly(arylene ether) and the olefinically unsaturated monomer. Within this range, the olefinically unsaturated monomer amount may specifically be at least about 20 parts by weight, more specifically at least about 30 parts by weight. Also within this range, the olefinically unsaturated monomer amount may specifically be up to about 80 parts per weight, more specifically up to about 60 parts by weight.

As the curable composition is defined as comprising multiple components, it will be understood that each component is chemically distinct, particularly in the instance that a single chemical compound may satisfy the definition of more than one component.

The curable composition may, optionally, further comprise a curing initiator. Curing initiators, also referred to as curing catalysts, are well known in the art and may be used to initiate the polymerization, curing, or crosslinking of numerous thermoplastics and thermosets including unsaturated polyester, vinyl ester and allylic thermosets. Non-limiting examples of curing initiators include those described in U.S. Pat. No. 5,407,972 to Smith et al., and U.S. Pat. No. 5,218,030 to Katayose et al. The curing initiator may include any compound capable of producing free radicals at elevated temperatures. Such curing initiators may include both peroxy and non-peroxy based radical initiators. Examples of useful peroxy initiators include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethyl-hexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy) butane, 2,2-bis(t-butylperoxy)octane, 2,5-dimethyl-2,5-di (benzoylperoxy)hexane, di(trimethylsilyl)peroxide, trimethylsilylphenyltriphenylsilyl peroxide, and the like, and mixtures thereof. Suitable non-peroxy initiators include, for example, 2,3-dimethyl-2,3-diphenylbutane, 2,3-trimethylsilyloxy-2,3-diphenylbutane, and the like, and mixtures thereof. The curing initiator for the unsaturated portion of the thermoset may further include any compound capable of initiating anionic polymerization of the unsaturated components. Such anionic polymerization initiators include, for example, alkali metal amides, such as sodium amide ($NaNH_2$) and lithium diethyl amide ($LiN(C_2H_5)_2$); alkali metal and ammonium salts of $C_1$-$C_{10}$ alkoxides; alkali metal and ammonium hydroxides; alkali metal cyanides; organometallic compounds such as the alkyl lithium compound n-butyl lithium; Grignard reagents such as phenyl magnesium bromide; and the like; and combinations thereof. In one embodiment, the curing initiator may comprise t-butylperoxy benzoate or dicumyl peroxide. The curing initiator may promote curing at a temperature in a range of about 0° C. to about 200° C.

When present, the curing initiator may be used at about 0.1 to about 5 parts by weight per 100 parts by weight total of the difunctionalized poly(arylene ether) and the olefinically unsaturated monomer. Within this range, the curing initiator amount may specifically be at least about 0.5 part by weight, more specifically at least about 1 part by weight. Also within this range, the curing initiator amount may specifically be up to about 4 parts by weight, more specifically up to about 3 parts by weight. Alternatively, the curing initiator amount may be expressed in units of micromoles per gram of resin, where "resin" consists of the difunctionalized poly(arylene ether) and the olefinically unsaturated monomer. In this embodiment, the curing initiator amount is at least about 100 micromoles per gram of resin.

The curable composition may, optionally, further comprise a curing inhibitor. Suitable curing inhibitors include, for example, diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and the like, and combinations thereof. Suitable curing inhibitors further include uncapped poly(arylene ether)s (i.e., poly(arylene ether)s having free hydroxyl groups). In one embodiment, the curing inhibitor comprises benzoquinone, hydroquinone, 4-t-butylcatechol, or a mixture thereof.

When the curing inhibitor is present, it may be used at about 0.005 to about 1 part by weight per 100 parts by weight total of the difunctionalized poly(arylene ether) and the olefinically unsaturated monomer. Within this range, the curing inhibitor amount may specifically be at least about 0.05 part by weight, more specifically at least about 0.1 part by weight. Also within this range, the curing inhibitor amount may specifically be up to about 0.5 part by weight, more specifically up to about 0.3 part by weight. In one embodiment, the curing inhibitor amount may be expressed in units of micromoles per gram of resin, where "resin" consists of the difunctionalized poly(arylene ether) and the olefinically unsaturated monomer. In this embodiment, the curing inhibitor amount may be at least about 50 micromoles per gram of resin.

The composition may, optionally, further comprise an adhesion promoter to improve adhesion between the cured composition and metallic substrates, particularly leadframes used in semiconductor packages. Suitable adhesion promoters include metal (meth)acrylate salts, combinations of an aromatic epoxy compound and an aromatic amine, copolymers of a vinyl aromatic compound and an α,β-unsaturated cyclic anhydride, partially (meth)acrylated epoxy compounds, and the like, and mixtures thereof. Metal (meth) acrylate salts may have the structure

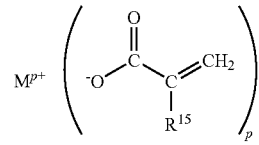

wherein each occurrence of $R^{15}$ is independently hydrogen or methyl, M is a metal from Groups 1-15 of the periodic table, and p is an integer from 1 to 6 corresponding to the valence of M. In one embodiment, M is a metal from Groups 1, 2, 12, or 13 of the periodic table. In one embodiment, M is zinc and p is 2. Combinations of an aromatic epoxy compound and an aromatic amine include those copolymers where the aromatic epoxy compound is a bisphenol-based epoxy resin (e.g., bisphenol A glycidyl ethers, bisphenol F glycidyl ethers, 4,4'-diphenol glycidyl ethers, 2,2',6,6'-tetramethyl-4,4'-diphenol glycidyl ethers), a novolak-type epoxy resin, or the like, or mixtures thereof; and the aromatic amine is a monocyclic aromatic amine (e.g., aniline, toluidine), a monocyclic aromatic diamine (e.g., diaminobenzene, xylylenediamine), a monocyclic aromatic amino alcohol (e.g., aminophenols), a polycyclic aromatic diamine (e.g., diaminodiphenylmethanes, tetramethyldiaminodiphenylmethanes, and diaminodiphenylsulfones), a polycyclic aromatic amine, or the like, or mixtures thereof. The aromatic epoxy compound and the aromatic amine may be used in a ratio such that the molar ratio of epoxy groups to amino hydrogen atoms is about 1:2 to about 2:1. When the adhesion promoter comprises a copolymer of a vinyl aromatic compound and an α,β-unsaturated cyclic anhydride, the vinyl aromatic compound may have the structure described above in the context of alkenyl aromatic monomers, and the α,β-unsaturated cyclic anhydride may be a $C_4$-$C_{12}$ cyclic anhydride. A preferred copolymer of a vinyl aromatic compound and an α,β-unsaturated cyclic anhydride is a copolymer of styrene and maleic anhydride having a styrene content of about 50 to about 95 weight percent and a maleic anhydride content of about 5 to about 50 weight percent. When the adhesion promoter comprises a partially (meth)acrylated epoxy compound, that compound is the reaction product of an aromatic epoxy compound, as described above, and acrylic acid or methacrylic acid, such that about 5 to about 95% of the epoxy moieties have been reacted to form (meth)acrylate ester groups. When present, the adhesion promoter may be used in an amount of about 0.1 to about 20 parts by weight per 100 parts by weight total of the difunctionalized poly(arylene ether) and the olefinically unsaturated monomer. Within this range, the adhesion promoter amount may specifically be at least about 1 part by weight, more specifically at least about 3 parts by weight. Also within this range, the adhesion promoter amount may specifically be up to about 15 parts by weight, more specifically up to about 10 parts by weight.

In one embodiment, the curable composition comprises a functionalized poly(arylene ether); an olefinically unsaturated monomer; and an adhesion promoter selected from metal (meth)acrylate salts, combinations of an aromatic epoxy compound and an aromatic amine, copolymers of a vinyl aromatic compound and an α,β-unsaturated cyclic anhydride, partially (meth)acrylated epoxy compounds, and mixtures thereof. In this embodiment the functionalized poly(arylene ether) may be a capped poly(arylene ether) or a ring-functionalized poly(arylene ether), each of which is defined below.

The functionalized poly(arylene ether) may be a capped poly(arylene ether). A capped poly(arylene ether) is defined herein as a poly(arylene ether) in which at least 50%, preferably at least 75%, more preferably at least 90%, yet more preferably at least 95%, even more preferably at least 99%, of the free hydroxyl groups present in the corresponding uncapped poly(arylene ether) have been functionalized by reaction with a capping agent.

The capped poly(arylene ether) may be represented by the structure

wherein Q is the residuum of a monohydric, dihydric, or polyhydric phenol, preferably the residuum of a monohydric or dihydric phenol, more preferably the residuum of a monohydric phenol; y is 1 to 100; J comprises repeating structural units having the formula

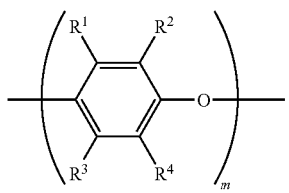

wherein m is 1 to about 200, preferably 2 to about 200; $R^2$ and $R^4$ are each independently halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like; $R^1$ and $R^3$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like; and K is a capping group produced by reaction of a phenolic hydroxyl group on the poly(arylene ether) with a capping reagent. The resulting capping group may be

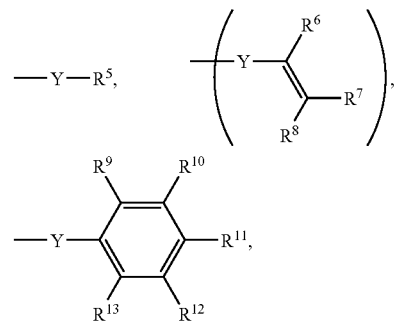

or the like, wherein $R^5$ is $C_1$-$C_{12}$ alkyl, or the like; $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like; $R^9$-$R^{13}$ are each independently hydrogen, halogen, $C_1$-$C_{12}$ alkyl, hydroxy, amino, or the like; and wherein Y is a divalent group such as

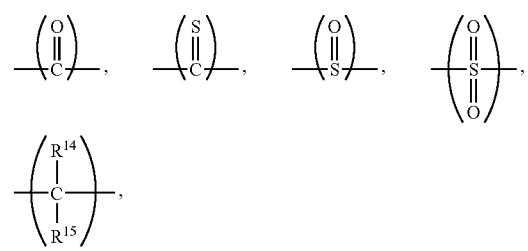

or the like, wherein $R^{14}$ and $R^{15}$ are each independently hydrogen, $C_1$-$C_{12}$ alkyl, or the like.

In one embodiment, Q is the residuum of a phenol, including polyfunctional phenols, and includes radicals of the structure

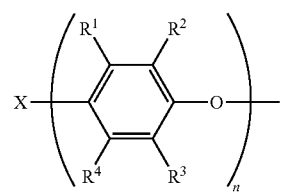

wherein $R^1$-$R^4$ are each independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ aminoalkyl, $C_1$-$C_{12}$ hydrocarbonoxy, $C_1$-$C_{12}$ halohydrocarbonoxy wherein at least two carbon atoms separate the halogen and oxygen atoms, or the like; X may be hydrogen, $C_1$-$C_{12}$ allyl, $C_6$-$C_{18}$ aryl, $C_7$-$C_{18}$ alkyl-substituted aryl, $C_7$-$C_{18}$ aryl-substituted alkyl, or any of the foregoing hydrocarbon groups containing at least one substituent such as carboxylic acid, aldehyde, alcohol, amino radicals, or the like; X also may be sulfur, sulfonyl, sulfuryl, oxygen, or other such bridging group having a valence of 2 or greater to result in various bis- or higher polyphenols; y and n are each independently 1 to about 100, preferably 1 to 3, and more preferably about 1 to 2; in a preferred embodiment, y=n. Q may also be the residuum of a diphenol, such as 2,2',6,6'-tetramethyl-4,4'-diphenol or bisphenol A.

In one embodiment, the capped poly(arylene ether) is produced by capping a poly(arylene ether) consisting essentially of the polymerization product of at least one monohydric phenol having the structure

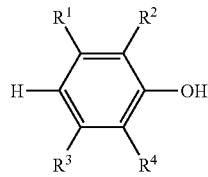

wherein $R^1$-$R^4$ are each independently hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbonoxy, $C_2$-$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol. The poly(arylene ether) may be a copolymer of at least two monohydric phenols, such as 2,6-dimethylphenol and 2,3,6-trimethylphenol. In another embodiment, the capped poly(arylene ether) comprises the difunctionalized poly(arylene ether) described above.

In a preferred embodiment, the capped poly(arylene ether) comprises at least one capping group having the structure

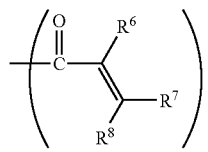

wherein $R^6$-$R^8$ are each independently hydrogen, $C_1$-$C_{12}$ alkyl, $C_2$-$C_{12}$ alkenyl, $C_6$-$C_{18}$ aryl, $C_7$-$C_{18}$ alkyl-substituted aryl, $C_7$-$C_{18}$ aryl-substituted alkyl, $C_2$-$C_{12}$ alkoxycarbonyl, $C_7$-$C_{18}$ aryloxycarbonyl, $C_7$-$C_{18}$ alkyl-substituted aryloxycarbonyl, $C_7$-$C_{18}$ aryl-substituted alkoxycarbonyl, nitrile, formyl, carboxylate, imidate, thiocarboxylate, or the like. Highly preferred capping groups include acrylate ($R^6$=$R^7$=$R^8$=hydrogen) and methacrylate ($R^6$=methyl, $R^7$=$R^8$=hydrogen).

The functionalized poly(arylene ether) may be a ring-functionalized poly(arylene ether). A ring-functionalized poly(arylene ether) is defined herein as a poly(arylene ether) comprising repeating structural units of the formula

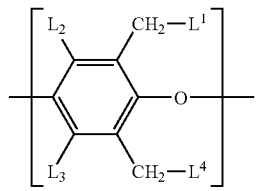

wherein each $L^1$-$L^4$ is independently hydrogen, an alkenyl group, or an alkynyl group; wherein the alkenyl group is represented by

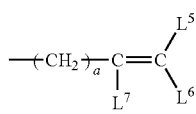

wherein $L^5$-$L^7$ are independently hydrogen or methyl, and a is an integer from 1 to 4; wherein the alkynyl group is represented by

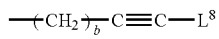

wherein $L^8$ is hydrogen, methyl, or ethyl, and b is an integer from 1 to 4; and wherein about 0.02 mole percent to about 25 mole percent of the total $L^1$-$L^4$ substituents in the ring-functionalized poly(arylene ether) are alkenyl and/or alkynyl groups. Within this range, it may be preferred to have at least about 0.1 mole percent, more preferably at least about 0.5 mole percent, alkenyl and/or alkynyl groups. Also within this range, it may be preferred to have up to about 15 mole percent, more preferably up to about 10 mole percent, alkenyl and/or alkynyl groups.

The ring-functionalized poly(arylene ether) may be prepared according to known methods. For example, an unfunctionalized poly(arylene ether) such as poly(2,6-dimethyl-1,4-phenylene ether) may be metalized with a reagent such as n-butyl lithium and subsequently reacted with an alkenyl halide such as allyl bromide and/or an alkynyl halide such as propargyl bromide. This and other methods for preparation of ring-functionalized poly(arylene ether) resins are described, for example, in U.S. Pat. No. 4,923,932 to Katayose et al.

There is no particular limitation on the molecular weight or intrinsic viscosity of the functionalized poly(arylene ether). In one embodiment, the composition may comprise a functionalized poly(arylene ether) having a number average molecular weight up to about 10,000 atomic mass units (AMU), preferably up to about 5,000 AMU, more preferably up to about 3,000 AMU. Such a functionalized poly(arylene ether) may be useful in preparing and processing the composition by reducing its viscosity.

In another embodiment, the composition may comprise a functionalized poly(arylene ether) having an intrinsic viscosity of about 0.08 to about 0.30 deciliters per gram (dL/g), preferably about 0.12 to about 0.30 dL/g, more preferably about 0.15 to about 0.25 dL/g as measured in chloroform at 25° C. Generally, the intrinsic viscosity of a functionalized poly(arylene ether) will vary insignificantly from the intrinsic viscosity of the corresponding unfunctionalized poly(arylene ether). Specifically, the intrinsic viscosity of a functionalized poly(arylene ether) will generally be within 10% of that of the unfunctionalized poly(arylene ether). These intrinsic viscosities may correspond approximately to number average molecular weights of about 5,000 to about 25,000 AMU. Within this range, a number average molecular weight of at least about 8,000 AMU may be preferred, and a number average molecular weight of at least about 10,000 AMU may be more preferred. Also within this range, a number average molecular weight up to about 20,000 AMU may be preferred. Such a functionalized poly(arylene ether) may provide the composition with a desirable balance of toughness and processability. It is expressly contemplated to employ blends of at least two functionalized poly(arylene ether)s having different molecular weights and intrinsic viscosities.

Methods for the preparation of functionalized poly(arylene ethers) as well as additional suitable functionalized poly(arylene ether) structures, are described in U.S. Patent Application Publication No. 2003-0096123 A1 to Yeager et al.

When the composition comprises a functionalized poly(arylene ether), an olefinically unsaturated monomer, and an adhesion promoter, it may comprise the functionalized poly(arylene ether) in an amount of comprising about 1 to about 90 parts by weight per 100 parts by weight total of the functionalized poly(arylene ether), the olefinically unsaturated monomer, and the adhesion promoter. Within this range, it may be preferred to use a functionalized poly(arylene ether) amount of at least about 5 parts by weight, more preferably at least about 10 parts by weight, still more preferably at least about 15 parts by weight. Also within this range, it may be preferred to use a functionalized poly(arylene ether) amount of up to about 80 parts by weight, more preferably up to about 60 parts by weight, yet more preferably up to about 40 parts by weight, still more preferably up to about 30 parts by weight. The composition may comprise about 10 to about 95 parts by weight of the olefinically unsaturated monomer per 100 parts by weight total of the functionalized poly(arylene ether), the olefinically unsaturated monomer, and the adhesion promoter. Within this range, the olefinically unsaturated monomer amount may specifically be at least about 20 parts by weight, more specifically at least about 30 parts by weight. Also within this range, the olefinically unsaturated monomer amount may specifically be up to about 90 parts per weight, more specifically up to about 80 parts by weight. The composition may comprise the adhesion promoter in an amount of about 0.1 to about 30 parts by weight per 100 parts by weight total of the functionalized poly(arylene ether), the olefinically unsaturated monomer, and the adhesion promoter. Within this range, the adhesion promoter amount may specifically be at least about 1 parts by weight, more specifically at least about 3 parts by weight, even more specifically at least 5. Also within this range, the adhesion promoter amount may specifically be up to about 20 parts by weight, more specifically up to about 15 parts by weight.

One embodiment is a cured composition obtained on curing a curable composition comprising a functionalized poly(arylene ether), an olefinically unsaturated monomer, and an adhesion promoter. The cured composition may be used to form useful articles. One embodiment is an article comprising the cured composition and a metallic substrate, wherein, wherein the article is formed by curing the curable composition in contact with the metallic substrate thereby forming an adhesive bond between the cured composition and the metallic substrate. The metallic substrate may be, for example, a copper foil.

The composition may, optionally, further comprise one or more fillers, including particulate fillers and fibrous fillers. Examples of such fillers are well known in the art and include those described in "Plastic Additives Handbook, 4$^{th}$ Edition" R. Gachter and H. Muller (eds.), P. P. Klemchuck (assoc. ed.) Hanser Publishers, New York 1993, pages 901-948. A particulate filler is herein defined as a filler having an average aspect ratio less than about 5:1. Non-limiting examples of fillers include silica powder, such as fused silica and crystalline silica; boron-nitride powder and boron-silicate powders for obtaining cured products having high thermal conductivity, low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (in its anhydrous, hemihydrated, dihydrated, or trihydrated forms), calcium carbonate including chalk, limestone, marble and synthetic, precipitated calcium carbonates, generally in the form of a ground particulate which often comprises 98+% $CaCO_3$ with the remainder being other inorganics such as magnesium carbonate, iron oxide, and alumino-silicates; surface-treated calcium carbonates; talc, including fibrous, nodular, needle shaped, and lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilane or acryloylsilane coatings to impart good physical properties to compounded blends; feldspar and nepheline syenite; silicate spheres; flue dust; cenospheres; fillite; aluminosilicate (armospheres), including silanized and metallized aluminosilicate; natural silica sand; quartz; quartzite; perlite; Tripoli; diatomaceous earth; synthetic silica, including those with various silane coatings, and the like.

In one embodiment, the particulate filler is a fused silica having an average particle size of about 1 to about 50 micrometers. A representative particulate filler comprises a first fused silica having a median particle size of about 0.03 micrometer to less than 1 micrometer, and a second fused silica having a median particle size of at least 1 micrometer to about 30 micrometers. The fused silicas may have essentially spherical particles, typically achieved by re-melting. Within the size range specified above, the first fused silica may specifically have a median particle size of at least about 0.1 micrometer, specifically at least about 0.2 micrometer. Also within the size range above, the first fused silica may specifically have a median particle size of up to about 0.9 micrometer, more specifically up to about 0.8 micrometer. Within the size range specified above, the second fused silica may specifically have a median particle size of at least about 2 micrometers, specifically at least about 4 micrometers. Also within the size range above, the second fused silica may specifically have a median particle size of up to about 25 micrometers, more specifically up to about 20 micrometers. In one embodiment, the composition comprises the first fused silica and the second fused silica in a weight ratio in a range of about 70:30 to about 99:1, specifically in a range of about 80:20 to about 95:5.

Fibrous fillers include short inorganic fibers, including processed mineral fibers such as those derived from blends comprising at least one of aluminum silicates, aluminum oxides, magnesium oxides, and calcium sulfate hemihydrate. Also included among fibrous fillers are single crystal fibers or "whiskers" including silicon carbide, alumina, boron carbide, carbon, iron, nickel, copper. Also included among fibrous fillers are glass fibers, including textile glass fibers such as E, A, C, ECR, R, S, D, and NE glasses and quartz. Representative fibrous fillers include glass fibers having a diameter in a range of about 5 to about 25 micrometers and a length before compounding in a range of about 0.5 to about 4 centimeters. Many other suitable fillers are described in U.S. Pat. No. 6,627,704 B2 to Yeager et al.

While it may be preferred to use nonconductive fillers for plastic-packaged electronic devices, the composition may be used for other applications in which conductive fillers are desirable. For such applications, suitable conductive fillers include graphite, conductive carbon black, conductive carbon fibers including single-wall carbon nanotubes and multi-wall carbon nanotubes, metal fibers, metal particles, particles of intrinsically conductive polymers, and the like, and mixtures thereof.

The formulation may also contain adhesion promoters to improve adhesion of the thermosetting resin to the filler or to an external coating or substrate. Also possible is treatment of the aforementioned inorganic fillers with adhesion promoter to improve adhesion. Adhesion promoters include chromium complexes, silanes, titanates, zirco-aluminates, propylene maleic anhydride copolymers, reactive cellulose esters and the like. Chromium complexes include those sold by DuPont under the tradename VOLAN®. Silanes include molecules having the general structure $(RO)_{(4-n)}SiY_n$ wherein n=1-3, R is an alkyl or aryl group and Y is a reactive functional group which can enable formation of a bond with a polymer molecule. Particularly useful examples of coupling agents are those having the structure $(RO)_3SiY$. Typical examples include vinyl triethoxysilane, vinyl tris(2-methoxy)silane, phenyl trimethoxysilane, γ-methacryloxypropyltrimethoxy silane, γ-aminopropyltriethoxysilane, γ-glycidoxypropyltrimethoxysilane, γ-mercaptopropyltrimethoxysilane, and the like. Silanes further include molecules lacking a reactive functional group, such as, for example, trimethoxyphenylsilane. Titanates include those developed by S. J. Monte et al. in Ann. Chem. Tech Conf. SPI (1980), Ann. Tech Conf. Reinforced Plastics and Composite Inst. SPI 1979, Section 16E, New Orleans; and S. J. Monte, Mod. Plastics Int., volume 14, number 6, pg. 2 (1984). Zirco-aluminates include those described by L. B. Cohen in Plastics Engineering, volume 39, number 11, page 29 (1983). The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

When present, the particulate filler may be used in an amount of about 5 to about 95 weight percent, based on the total weight of the composition. Within this range, the particulate filler amount may specifically be at least about 20 weight percent, more specifically at least about 40 weight percent, even more specifically at least about 75 weight percent. Also within this range, the particulate filler amount may specifically be up to about 93 weight percent, more specifically up to about 91 weight percent.

When present, the fibrous filler may be used in an amount of about 2 to about 80 weight percent, based on the total weight of the composition. Within this range, the fibrous filler amount may specifically be at least about 5 weight percent, more specifically at least about 10 weight percent, yet more specifically at least about 15 weight percent. Also within this range the fibrous filler amount may specifically be up to about 60 weight percent, more specifically up to about 40 weight percent, still more specifically up to about 30 weight percent.

The aforementioned fillers may be added to the thermosetting resin without any treatment, or after surface treatment, generally with an adhesion promoter.

The curable composition may, optionally, further comprise one or more additives known in the art, such as, for example, dyes, pigments, colorants, antioxidants, heat stabilizers, light stabilizers, plasticizers, lubricants, flow modifiers, drip retardants, flame retardants, antiblocking agents, antistatic agents, flow-promoting agents, processing aids, substrate adhesion agents, mold release agents, toughening agents, low-profile additives, stress-relief additives, and the like, and combinations thereof. Those skilled in the art may select suitable additives and determine suitable amounts without undue experimentation.

One advantage of the curable compositions is their improved molding properties. For example, the curable composition may exhibit a spiral flow of at least about 50 centimeters measured at a temperature in the range of about 130 to about 180° C. and a pressure in the range of about 3 to about 7 megapascals, as measured according to the procedure described below.

In one embodiment, the curable composition comprises a difunctionalized poly(arylene ether) having an intrinsic viscosity of about 0.08 to about 0.25 deciliter per gram at 25° C.; wherein the difunctionalized poly(arylene ether) has the structure

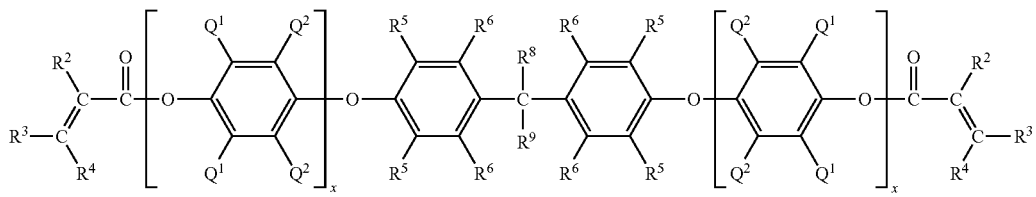

wherein $Q^1$ is methyl, each occurrence of $Q^2$ is independently hydrogen or methyl, each occurrence of $R^2$ is independently hydrogen or methyl, $R^3$ and $R^4$ are hydrogen, $R^8$ and $R^9$ are independently hydrogen or $C_1$-$C_6$ hydrocarbyl, and each occurrence of x is 1 to about 100; an olefinically unsaturated monomer comprising an acryloyl monomer comprising at least two acryloyl moieties; a cure initiator selected from benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl) benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5- dimethyl-2,5-di(benzoylperoxy)hexane, di(trimethylsilyl) peroxide, trimethylsilylphenyltriphenylsilyl peroxide, and mixtures thereof; and a curing inhibitor selected from diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols, 4-t-butylcatechol, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and mixtures thereof.

In another embodiment, the curable composition comprises about 5 to about 90 parts by weight of a difunctionalized poly(arylene ether) having an intrinsic viscosity of about 0.08 to about 0.20 deciliter per gram at 25° C.; wherein the difunctionalized poly(arylene ether) has the structure

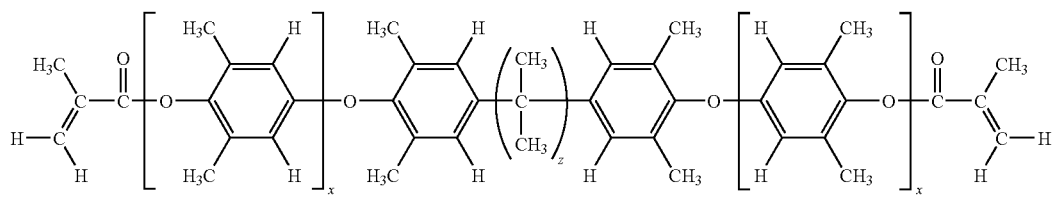

wherein each occurrence of x is 1 to about 50, and z is 0 or 1; about 5 to about 90 parts by weight of an acryloyl monomer selected from trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl(meth)acrylate, methyl(meth)acrylate, methacryloxypropyl trimethoxysilane, ethoxylated (2) bisphenol A di(meth)acrylate, or a mixture of at least two of the foregoing acryloyl monomers; about 0.2 to about 5 part by weight of a curing initiator selected from benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy)hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl) peroxide, trimethylsilylphenyltriphenylsilyl peroxide, and mixtures thereof; and about 0.005 to about 1 part by weight of a curing inhibitor selected from diazoaminobenzene, phenylacetylene, sym-trinitrobenzene, p-benzoquinone, acetaldehyde, aniline condensates, N,N'-dibutyl-o-phenylenediamine, N-butyl-p-aminophenol, 2,4,6-triphenylphenoxyl, pyrogallol, catechol, hydroquinone, monoalkylhydroquinones, p-methoxyphenol, t-butylhydroquinone, $C_1$-$C_6$-alkyl-substituted catechols, 4-t-butylcatechol, dialkylhydroquinone, 2,4,6-dichloronitrophenol, halogen-ortho-nitrophenols, alkoxyhydroquinones, mono- and di- and polysulfides of phenols and catechols, thiols, oximes and hydrazones of quinone, phenothiazine, dialkylhydroxylamines, and mixtures thereof; wherein all parts by weight are based on 100 parts by weight total for the difunctionalized poly(arylene ether) and the acryloyl monomer.

Another embodiment is a method of forming a curable composition, comprising: blending a difunctionalized poly (arylene ether) having an intrinsic viscosity of about 0.05 to about 0.30 deciliter per gram at 25° C., and an olefinically unsaturated monomer to form an intimate blend.

One embodiment is a cured composition obtained by curing any of the above-described curable compositions. It will be understood that the term "curing" includes partially curing and fully curing. Because the components of the curable composition may react with each other during curing, the cured compositions may be described as comprising the reaction products of the curable composition components.

One advantage of the curable compositions is that they exhibit excellent stiffness and impact strength after curing. For example, the cured composition may exhibit a flexural strength of at least about 90 megapascals, measured according to ASTM D790. As another example, the cured composition may exhibit a break energy of at least 0.8 joules, measured according to ASTM D790.

Another advantage of the curable compositions is that they exhibit excellent dispersion of the poly(arylene ether) phase after curing. For example, the cured composition may exhibit a domain size of cured olefinically unsaturated monomer phase encapsulated by poly(arylene ether) of about 50 nanometers to about 1 micrometer, as determined by transmission electron microscopy. This high degree of poly (arylene ether) dispersion translates into multiple property advantages, including improved uniformity of surface appearance.

Another embodiment is an article comprising any of the cured compositions. The curable composition is useful for fabricating a wide range of articles, and it is particularly suitable for use as an encapsulant for electronic devices.

The invention is further illustrated by the following non-limiting examples.

EXAMPLE 1

This example describes the preparation of a redistributed polyphenylene ether resin. To a three-necked flask were added poly(2,6-dimethyl-1,4-phenylene ether) (intrinsic viscosity=0.46 deciliters/gram (dL/g), 90 grams (g)), toluene (260 milliliters (mL)), and bisphenol A (5.4 g). The reaction mixture was heated to 90° C. to form a homogeneous solution. To the heated solution was added benzoyl peroxide (5.4 g) portion-wise. After the addition was complete, the reaction was maintained at 90° C. for about two hours. The solution was then cooled to room temperature and the product polyphenylene ether was precipitated from methanol. The resulting material contained 0.56 weight percent hydroxyl groups (as —OH). Hydroxyl end groups were measured by derivatization with a phosphorus reagent and quantification by $^{31}$P NMR, as described in K. P. Chan, D. S. Argyropoulos, D. M. White, G. W. Yeager and A. S. Hay, *Macromolecules*, 1994, volume 27, pages 6371 ff.

EXAMPLES 2-9

COMPARATIVE EXAMPLES 1 AND 2

Several redistributed poly(arylene ether) resins were prepared using the procedure of Example 1 and variations in the intrinsic viscosity of the poly(arylene ether) starting material, the concentration of bisphenol A, and the concentration of benzoyl peroxide. All reactions were run at 25 weight percent solids in toluene. One sample, Example 6, also used a modified work-up in which the sample was refluxed with pyrrolidine to remove any benzoate ester groups from the redistributed polyphenylene ether. After the reaction mixture was cooled to room temperature, the product was precipitated by combining one volume of the cooled reaction mixture with twice the volume of methanol. The precipitate was filtered and washed with additional methanol. Hydroxyl group content was determined as described above. Intrinsic viscosities were measured at 25° C. in chloroform. Number-average molecular weight ($M_n$) and weight-average molecular weight ($M_w$), both expressed in atomic mass units (AMU), were determined by gel permeation chromatography using polystyrene standards. The degree of functionality ($d_f$) for each sample, corresponding to the average number of hydroxyl groups per poly(arylene ether) chain, is calculated according to the formula $$d_f = ([OH]/17.01) \times (M_n/10^6)$$

where [OH] is the hydroxyl content of the polyphenylene ether in parts per million by weight, and $M_n$ is the number average molecular weight of the polyphenylene ether in atomic mass units. Unreacted starting polyphenylene ethers were also characterized for comparison (Comparative Examples 1 and 2).

Reaction conditions and product characterization results are summarized in Table 1.

TABLE 1

| | C. Ex. 1 | Ex. 2 | Ex. 3 | Ex. 4 |
|---|---|---|---|---|
| Reaction Conditions | | | | |
| PPE starting material IV (dL/g) | 0.25 | 0.25 | 0.25 | 0.25 |
| PPE amount (g) | — | 60 | 60 | 60 |
| Bisphenol A amount (g) | — | 0.60 | 1.20 | 1.80 |
| Benzoyl peroxide amount (g) | — | 0.60 | 1.20 | 1.80 |
| Pyrrolidine work-up? | — | no | no | no |
| Properties | | | | |
| Product IV (dL/g) | — | 0.234 | 0.175 | 0.157 |
| OH content (weight percent) | 0.17 | 0.28 | 0.41 | 0.53 |
| $M_n$ (AMU) | 5191 | 3911 | 3174 | 2586 |
| $M_w$ (AMU) | 21993 | 15479 | 11340 | 9043 |
| Degree of functionality | 0.52 | 0.64 | 0.77 | 0.81 |

| | Ex. 5 | Ex. 6 | C. Ex. 2 | Ex. 7 |
|---|---|---|---|---|
| Reaction Conditions | | | | |
| PPE starting material IV (dL/g) | 0.25 | 0.25 | 0.31 | 0.31 |
| PPE amount (g) | 60 | 60 | 60 | 60 |
| Bisphenol A amount (g) | 2.40 | 0.60 | — | 0.60 |
| Benzoyl peroxide amount (g) | 2.40 | 0.60 | — | 0.60 |
| Pyrrolidine work-up? | no | yes | — | no |
| Properties | | | | |
| Product IV (dL/g) | 0.135 | 0.135 | 0.323 | 0.299 |
| OH content (weight percent) | 0.64 | 0.67 | 0.10 | 0.21 |
| $M_n$ (AMU) | 1553 | 691 | 5872 | 4378 |
| $M_w$ (AMU) | 7400 | 6772 | 27828 | 20450 |
| Degree of functionality | 0.58 | 0.27 | 0.35 | 0.54 |

| | Ex. 8 | Ex. 9 |
|---|---|---|
| Reaction Conditions | | |
| PPE starting material IV (dL/g) | 0.31 | 0.31 |
| PPE amount (g) | 60 | 60 |
| Bisphenol A amount (g) | 1.20 | 1.80 |
| Benzoyl peroxide amount (g) | 1.20 | 1.80 |
| Pyrrolidine work-up? | no | no |
| Properties | | |
| Product IV (dL/g) | 0.226 | 0.180 |
| OH content (weight percent) | 0.34 | 0.44 |
| $M_n$ (AMU) | 3237 | 2884 |
| $M_w$ (AMU) | 14068 | 11532 |
| Degree of functionality | 0.64 | 0.75 |

EXAMPLE 10

A redistributed polyphenylene ether was prepared as in Example 1, using as starting materials a poly(2,6-dimethyl-1,4-phenylene ether) (PPE) having an intrinsic viscosity of 0.41 dL/g and a hydroxyl content of 0.65 weight percent, 6 weight percent bisphenol A (based on PPE), and 6 weight percent benzoyl peroxide (based on PPE). The reaction mixture was refluxed with pyrrolidine (at 2.4 times the molar level of benzoyl peroxide) to remove any benzoate ester groups. The resulting redistributed PPE was methacrylate capped in a reaction using 362 g redistributed PPE, 362 g styrene, 5 g dimethylaminopyridine, and 65.2 g methacrylic anhydride. The methacrylate-capped polyphenylene ether product had a hydroxyl content less than the detection limit of 15 parts per million by weight.

EXAMPLE 11

Using the procedure described in Example 1, a redistributed polyphenylene ether was prepared using as starting materials 450 g of a poly(2,6-dimethyl-1,4-phenylene ether) having an intrinsic viscosity of 0.25 dL/g, 1170 mL of toluene, 18 g of bisphenol A, and 18 g of benzoyl peroxide. After three hours, 33 mL of pyrrolidine was added and the reaction mixture was refluxed for another 20 hours. The product was precipitated in methanol, filtered, washed, and dried at 110° C. in a vacuum oven for 20 hours. The resulting redistributed polyphenylene ether was methacrylate capped in a reaction mixture containing 363.6 g redistributed polyphenylene ether, 363.6 g styrene, 5 g dimethylaminopyridine, and 43.47 g methacrylic anhydride. The reaction mixture was maintained at 85° C. for 23 hours, yielding a methacrylate-capped polyphenylene ether having a hydroxyl content of 90.9 parts per million by weight.

EXAMPLES 12 AND 13

COMPARATIVE EXAMPLES 3-5

Five compositions were prepared and molded to examine the effect of capped poly(arylene ether) structure on the shrinkage and appearance of molded parts. Examples 12 and 13 used a methacrylate dicapped polyphenylene ether (PPE-MA) prepared by redistribution and subsequent capping of a polyphenylene ether having an intrinsic viscosity of 0.25 dL/g. Thus, the dicapped PPE-MA had an intrinsic viscosity less than 0.25 dL/g. Comparative Examples 3 and 4 used a methacrylate monocapped polyphenylene ether prepared from an uncapped polyphenylene ether having an intrinsic viscosity of about 0.40 dL/g. Comparative Example 5 used a methacrylate monocapped polyphenylene ether prepared from an uncapped polyphenylene ether having an intrinsic viscosity of about 0.12 dL/g. To prepare samples for testing, methacrylate-capped polyphenylene ether (PPE-MA) was combined with styrene, and the mixture was heated to 80° C. to dissolved the polyphenylene ether. The mixture was then vacuum-degassed at 80° C. to yield a bubble-free, transparent solution. Benzoyl peroxide was then added and the resulting mixture was poured into a flexbar mold, which had been pre-heated to 75° C. The filled mold was placed into a convection oven then exposed to a heating profile that ramped up to 110° C. and back down to 45° C. over the course of about three hours. The molded parts were visually inspected, noting appearance and whether or not shrinkage of the part from the mold appeared uniform. Compositions and results are summarized in Table 2. The results show that only Examples 12 and 13, prepared from methacrylate dicapped polyphenylene ether having a low intrinsic viscosity exhibited good overall appearance, uniform shrinkage, and absence of cracks and bubbles.

TABLE 2

|  | Ex. 12 | Ex. 13 | C. Ex. 3 | C. Ex. 4 | C. Ex. 5 |
| --- | --- | --- | --- | --- | --- |
| Composition |  |  |  |  |  |
| PPE-MA amount (pbw) | 0.40 | 0.55 | 0.40 | 0.55 | 0.40 |
| PPE-MA IV (dL/g) | <0.25 | <0.25 | 0.40 | 0.40 | 0.12 |
| Styrene amount (pbw) | 0.58 | 0.43 | 0.58 | 0.43 | 0.58 |
| mono- or di-capped? | di- | di- | mono- | mono- | mono- |
| Appearance |  |  |  |  |  |
| Overall appearance | good | good | poor | poor | poor |
| Uniform shrinkage? | yes | yes | no | no | no |
| Cracks? | no | no | yes | yes | yes |
| Bubbles? | no | no | yes | yes | yes |

EXAMPLE 14

This example describes the preparation of methacrylate-capped poly(arylene ether) from a redistributed poly(arylene ether). A redistributed poly(arylene ether) (100 g), prepared according to the procedure of Example 1, was dissolved in toluene (300 mL). To the resulting solution was added 4-dimethylaminopyridine (2.68 g), triethylamine (6.68 g), and methacrylic anhydride (10.16 g). The reaction mixture was heated to 90° C. and heated overnight. The reaction product, a methacrylate-capped poly(arylene ether), was precipitated from methanol and contained 10 ppm of uncapped hydroxyl end group.

EXAMPLES 15-21

Seven polymerization reactions were used to prepare polyphenylene ethers having varying degrees of functionalization. In each case, the reaction mixture components were 2,6-xylenol (760.86 g), toluene (2512.87 g), cuprous bromide (CuBr; 6.1 g), di-t-butylethylenediamine (1.254 g), di-n-butylamine (7.803 g), dimethylbutylamine (26.52 g), and quaternary ammonium surfactant (0.77 g). All of the 2,6-xylenol was added at the beginning of the reaction. Samples were taken at recorded reaction times, the product poly(arylene ether) was precipitated with methanol, dried, and analyzed for molecular weight and hydroxyl endgroup content. In each case, the end of the reaction time was defined by the addition of an aqueous nitrilotriacetic acid (NTA) solution to deactivate the reaction catalyst. So, when the reequilibration time is zero in Table 3, the NTA solution was quickly mixed with the reaction mixture and the resulting two-phase mixture was separated by centrifugation, effectively limiting the reequilibration time to a few minutes. For longer reequilibration times, the NTA solution was added and the entire two-phase mixture was stirred for the specified equilibration time, then separated by centrifugation. The re-equilibration temperature for all samples was 60° C. except for Example 3, where equilibration temperature was 60° C. for the first two hours and 85° C. for the last two hours.

Table 3 shows the hydroxyl content and number average molecular weight of the poly(arylene ether) as a function of varying oxygen flow rate, exotherm temperature, reaction time, oxygen pressure, and reequilibration time. Reaction conditions and poly(arylene ether) properties are summarized in Table 1. The results show that high oxygen flow and pressure yield the highest degree of functionality in poly(arylene ether) after re-equilibration for 1-2 hours.

TABLE 3

| Ex. No. | $O_2$ flow (L/min) | Exotherm temp. (° C.) | Rxn time (min) | $O_2$ Pressure (bar) | Re-equil. Time (hrs) | [OH] (ppm) | $M_n$ (g/mol) | $d_f$ |
|---|---|---|---|---|---|---|---|---|
| 15 | 1.4 | 25 | 73 | 1.4 | 1.2 | 2170 | 12600 | 1.61 |
|    |     |    |    |     | 2   | 2262 | 11900 | 1.58 |
|    |     |    | 76 | 2.3 | 1.2 | 1715 | 15200 | 1.53 |
|    |     |    |    |     | 2   | 1918 | 13500 | 1.52 |
| 16 | 0.95 | 25 | 95 | 0.6 | 0 | 1501 | 12600 | 1.11 |
|    |     |    |    |     | 2 | 1432 | 12600 | 1.06 |
|    |     |    |    |     | 4 | 1595 | 12200 | 1.14 |
|    |     |    | 100 | 1.3 | 0 | 836 | 15800 | 0.78 |
|    |     |    |    |     | 2 | 1649 | 11600 | 1.13 |
|    |     |    |    |     | 4 | 1699 | 11500 | 1.15 |
|    |     |    | 105 | 1.9 | 0 | 680 | 18300 | 0.73 |
|    |     |    |    |     | 2 | 1562 | 12500 | 1.15 |
|    |     |    |    |     | 4 | 1408 | 12400 | 1.03 |
| 17 | 0.95 | 25 | 93 | 0.5 | 0 | 1815 | 9690 | 1.03 |
|    |     |    |    |     | 2 | 1865 | 11000 | 1.21 |
|    |     |    |    |     | 4 | 1860 | 11100 | 1.21 |
|    |     |    | 96 | 0.7 | 0 | 1317 | 12500 | 0.97 |
|    |     |    |    |     | 2 | 2161 | 10100 | 1.28 |
|    |     |    |    |     | 4 | 2125 | 10000 | 1.25 |
| 18 | 0.82 | 25 | 105 | 0.6 | 0 | 1590 | 11600 | 1.08 |
|    |     |    |    |     | 2 | 2237 | 8870 | 1.22 |
|    |     |    | 107 | 0.8 | 0 | 1275 | 13700 | 1.03 |
|    |     |    |    |     | 2 | 1853 | 10100 | 1.10 |
| 19 | 0.82 | 36 | 107 | 0.4 | 0 | 2308 | 5010 | 0.68 |
|    |     |    |    |     | 2 | 3618 | 7850 | 1.67 |
|    |     |    | 109.5 | 0.6 | 0 | 1816 | 6110 | 0.65 |
|    |     |    |    |     | 2 | 2541 | 9160 | 1.37 |
| 20 | 0.82 | 47 | 112 | 0.4 | 0 | 2368 | 5390 | 0.75 |
|    |     |    |    |     | 2 | 3262 | 7090 | 1.36 |
|    |     |    | 115 | 0.5 | 0 | 1831 | 5780 | 0.62 |
|    |     |    |    |     | 2 | 2910 | 7870 | 1.35 |

Example 21 was prepared using reagents as described above, except that 64.75 g of 2,2-bis(3,5-dimethyl-4-hydroxyphenyl)propane (tetramethyl bisphenol A; TMBPA) was added gradually throughout the reaction time. The results in Table 2 show that the addition of TMBPA increased the functionality of the poly(arylene ether).

TABLE 4

| Ex. No. | $O_2$ flow (L/min) | Exotherm temp. (° C.) | Rxn time (min) | $O_2$ Pressure (bar) | Re-equil. Time (hrs) | [OH] (ppm) | $M_n$ (g/mol) | $d_f$ |
|---|---|---|---|---|---|---|---|---|
| 21 | 1.42 | 25 | 82 | 0.5 | 0 | 2984 | 9040 | 1.59 |
|    |     |    |    |     | 2 | 3437 | 10000 | 2.02 |
|    |     |    | 88 | 0.6 | 0 | 2548 | 7810 | 1.17 |
|    |     |    |    |     | 2 | 3115 | 8530 | 1.56 |

EXAMPLE 22

This example describes the synthesis of difunctionalized poly(arylene ether) by polymerization of 2,6-dimethylphenol in the presence of teramethylbisphenol A. The following inputs were charged to a Morton flask equipped with an overhead stirrer, thermometer, addition funnel, and oxygen inlet tube: 180 mL toluene, 5.0 g tetramethyl bisphenol A, 0.56 mL of a 10% solution of methyltrioctylammonium chloride (ADOGEN® 464) in toluene, 13.2 mL of a solution of amines in toluene (prepared by combining 1 mL di-t-butylethylenediamine, 20 mL dimethylbutyl amine, 5.3 mL dibutylamine and 61.4 mL toluene), 12 mL of a 50% solution of 2,6-dimethylphenol in toluene, and 0.5 mL of a copper bromide solution. The mixture was stirred vigorously and then oxygen was bubbled through the solution at a flow rate of approximately 0.4 standard cubic feet per hour (SCFH). One hundred eight milliliters of the 50% solution of 2,6-dimethyl phenol in toluene was added drop-wise via the addition funnel over a period of about 23 minutes. An ice water bath was used to maintain the reaction temperature at about 25° C. during this time.

Once addition was complete, the ice bath was removed and the reaction temperature increased to about 35° C. The reaction exotherm allowed this temperature to be maintained for 15-20 minutes. Once the temperature began to fall, a heated water bath was used to return the reaction to 35° C. After an hour at this temperature, the oxygen flow was discontinued and the water bath was heated up to 60° C. This temperature was maintained for another 60 minutes. The reaction was then quenched with 2 mL of acetic acid and allowed to cool to room temperature.

The product was isolated using precipitation with methanol. After filtration and drying in a vacuum oven, 56.87 g of material was obtained. GPC analysis using polystyrene standards indicated a number average molecular weight of 5334 AMU and a weight average molecular weight of 11217 AMU. The product had an average of 1.7 hydroxy groups per chain.

EXAMPLE 23

This example describes the synthesis of a dicapped poly (arylene ether). Fifty-six grams of the polymer prepared in Example 22 was mixed with 270 mL toluene, 8.7 mL of methacrylic anhydride, and 0.9 g of 4-dimethylaminopyridine and heated with vigorous agitation to a temperature of approximately 80° C. After three hours at this temperature the reaction mixture was cooled to room temperature and then the product was isolated again using methanol precipitation. After filtration the product was dried in a vacuum oven.

EXAMPLE 24

COMPARATIVE EXAMPLES 6-9

These examples describe the preparation, molding and curing, and post-cure characterization of curable compositions varying in the poly(arylene ether)'s intrinsic viscosity and methacrylate functionalization. Example 24 and Comparative Examples 7-9 contained 14.5 weight percent poly (arylene ether), 82% ethoxylated(2)bisphenol A dimethacrylate (obtained as Sartomer SR 348), 0.5% of the cure inhibitor t-butylcatechol, and 3% dicumyl peroxide. Comparative Example 6 was similar except that contained no poly(arylene ether) and 96.5% ethoxylated(2)bisphenol A dimethacrylate. In Example 24 and Comparative Examples 7-9, the poly (arylene ether) had an intrinsic viscosity (IV) of 0.12 or 0.30 dL/g, and it was either uncapped (methacrylate functionality=0), monocapped (methacrylate functionality=1), or dicapped (methacrylate functionality=2). The dicapped poly (arylene ether) was prepared according to the methods of Examples 22 and 23.

To prepare the curable compositions containing poly (arylene ether), a single-phased mixture of poly(arylene ether), inhibitor, and dimethacrylate monomer was first obtained by stirring the solid poly(arylene ether) and inhibitor into the liquid monomer at about 150 to about 170° C. After the mixture clarified, it was cooled below 130° C., and dicumyl peroxide was added. The resulting stirred mixture was poured into a cool aluminum tray, where it cooled to a taffy-like consistency. A sample of the material was compression molded (Pasadena, 160° C., 5 ton, 5 min) into round disks with dimensions of 4 inch diameter by ⅛ inch thickness using polished stainless steel tooling, top and bottom and a Viton o-ring to seal the circular perimeter. After demolding, the disks were postcured for two hours at 175° C. in a convection oven. The disks were wet cut to 3 inch by ½ inch by ⅛ inch straight bars using a diamond-encrusted aluminum blade in a tile saw. The bars were then dried for 1 hour at 110° C. in a convection oven.

Flexural Testing. The samples were tested at room temperature according to ASTM D790 for three point bending flexural test, which yielded the "flexural strength", "flexural modulus", "break strain", and "break energy" values in Table 5, and ASTM D5045 for single edge notched three point bending test, which yielded the "critical stress intensity" values in Table 5. The flexural modulus is the slope of the initial part of the stress-strain curve and the break energy is the area under the curve. Nine to eleven bars were tested for each sample, and uncertainties in Table 5 represent one standard deviation.

Transmission Electron Microscopy. The samples were ultra-microtomed at room temperature to produce thin sections roughly 90 nanometers in thickness. Serial sections were floated on water in the diamond knife boat and harvested on standard 300-mesh Cu TEM grids. Micrographs were taken on a Philips CM100 transmission electron microscope operated at an accelerating voltage of 100 kilovolts. Vapor-phase Ruthenium tetraoxide staining preferentially darkens the PPO-rich phase leading to enhanced contrast in the TEM image.

Figure 2:
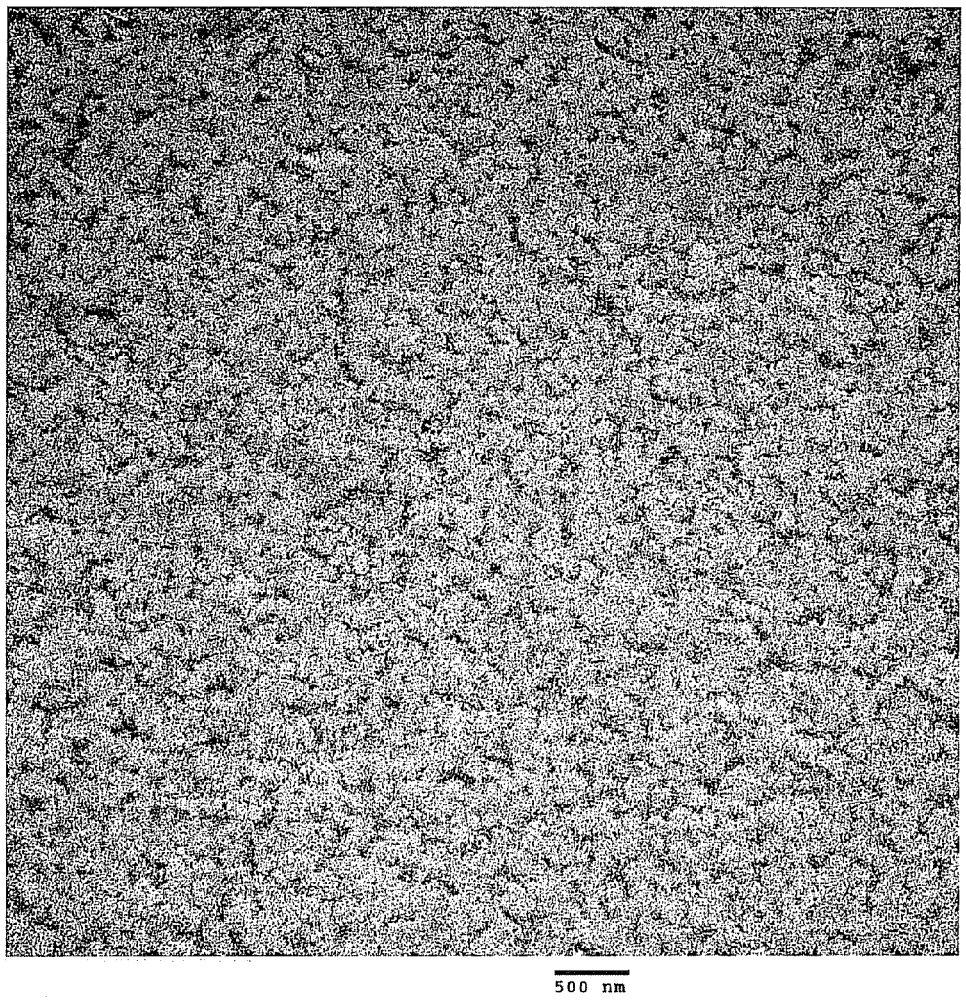
FIG. 2 is a transmission electron micrograph corresponding to Comparative Example 7.
Figure 3:
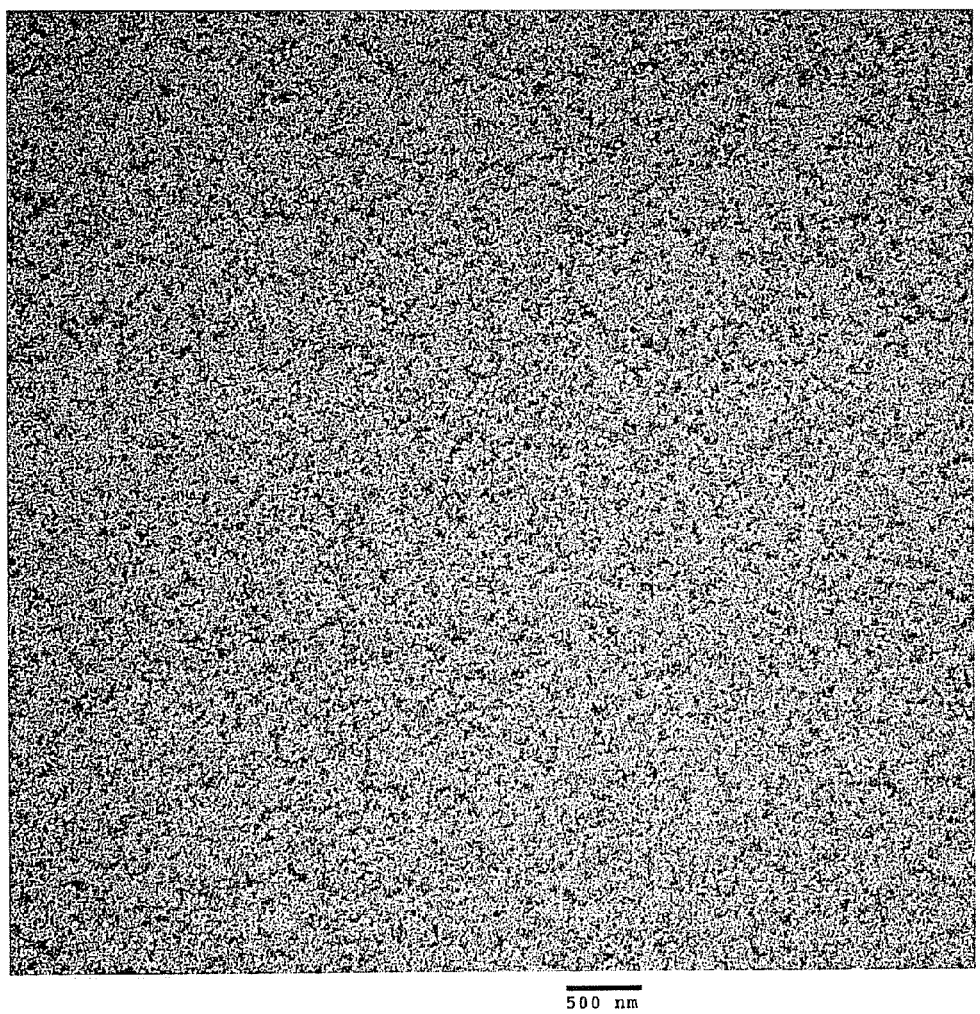
FIG. 3 is a transmission electron micrograph corresponding to Example 24.
Figure 4:
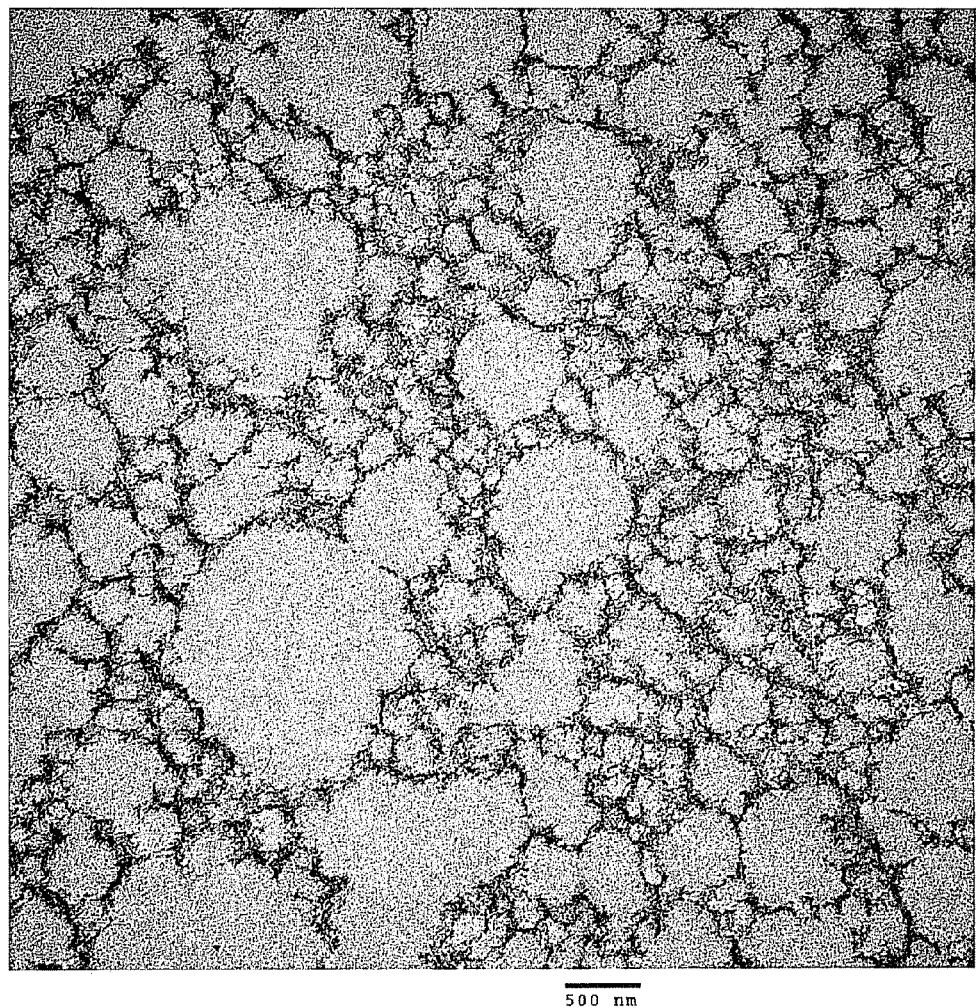
FIG. 4 is a transmission electron micrograph corresponding to Comparative Example 8.
Figure 5:
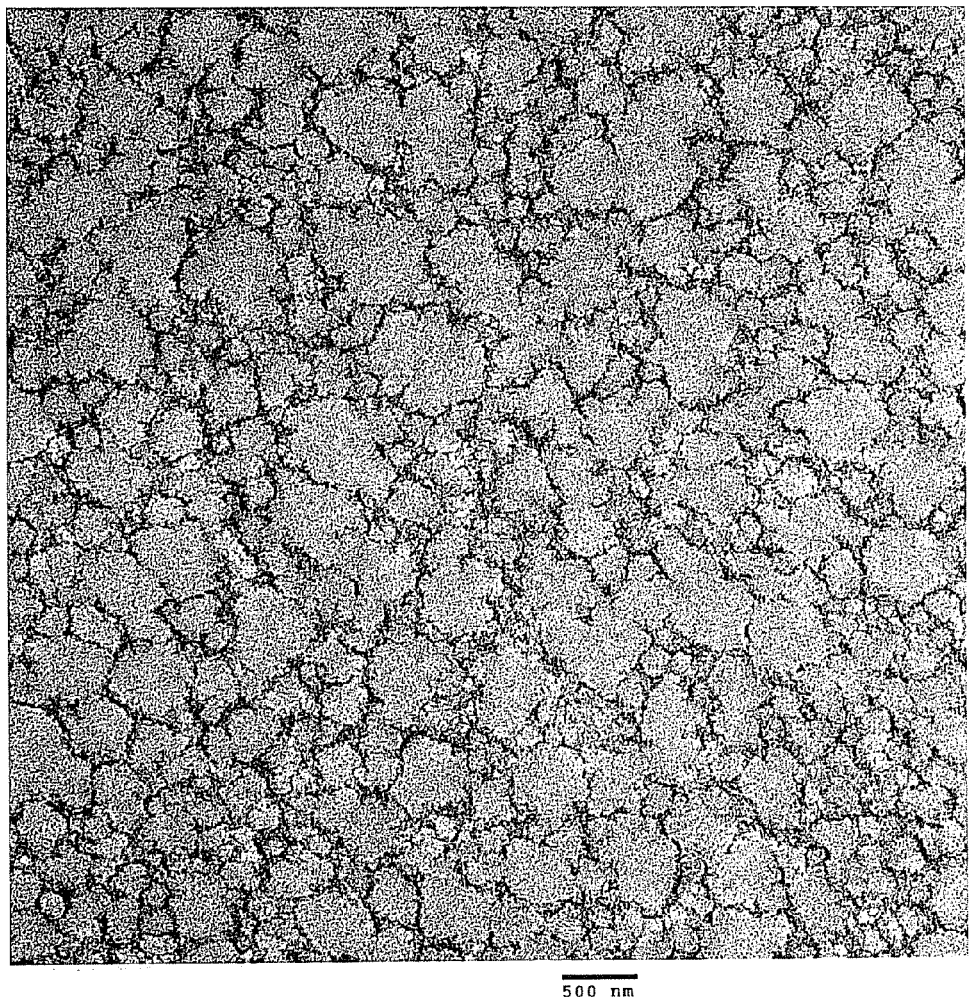
FIG. 5 is a transmission electron micrograph corresponding to Comparative Example 9.

Results, presented in Table 5, show that the low intrinsic viscosity difunctionalized poly(arylene ether) produced a high flexural strength and break energy close to those of the high intrinsic viscosity monofunctional poly(arylene ether), but the low intrinsic viscosity difunctionalized poly(arylene ether) exhibited much better flow properties. The photomicrographs, presented in FIGS. 1-5 respectively for C. Ex. 6, C. Ex. 7, Ex. 24, C. Ex. 8, and C. Ex. 9, show that the cured sample corresponding to Example 24 (FIG. 3; 0.12 IV dicapped PPE), exhibits finer dispersion of the cured olefinically unsaturated monomer phase encapsulated by poly(arylene ether) than does Comparative Example 7 (FIG. 2; 0.12 IV monocapped PPE) or Comparative Example 9 (FIG. 5; 0.30 monocapped PPE), indicating significantly higher compatibility with the olefinically unsaturated monomer.

difunctionalized (methacrylate dicapped) poly(arylene ether) prepared by methacrylate capping of a dihydroxy poly(arylene ether) synthesized by copolymerization of 2,6-dimethylphenol and 2,2-bis(4-hydroxy-2,6-dimethylphenyl)propane (TMBPA); the difunctionalized poly(arylene ether) had a number average molecular weight of 3,111 AMU and a weight average molecular weight of 5,838 AMU. Example 26 used a difunctionalized (methacrylate dicapped) poly(arylene ether) prepared by methacrylate capping of a dihydroxy poly(arylene ether) synthesized by polymerization of 2,6-dimethylphenol followed by redistribution with bisphenol A and benzoyl peroxide; the difunctionalized poly(arylene ether) had a number average molecular weight of 5,712 AMU and a weight average molecular weight of 16,997 AMU. Comparative Example 10 used a monofunctionalized (methacrylate capped) poly(2,6-dimethyl-1,4-phenylene ether) having an intrinsic viscosity of about 0.30 dL/g, a number average molecular weight of 17,814 AMU, and a weight average molecular weight of 37,474 AMU. Comparative Example 11 used a monofunctionalized (methacrylate capped) poly(2,6-dimethyl-1,4-phenylene ether) having an intrinsic viscosity of about 0.25 dL/g, a number average molecular weight of 12,869 AMU, and a weight average molecular weight of 26,300 AMU. Comparative Example 12 used a monofunctionalized (methacrylate capped) poly(2,6-dimethyl-1,4-phenylene ether) having an intrinsic viscosity of about 0.12 dL/g, a number average molecular weight of 4,176 AMU, and a weight average molecular weight of 7,631 AMU.

All curable compositions consisted of 85.57 parts by weight of fused silica, 1.245 parts by weight of organophosphate flame retardant obtained as Clariant OP1311, 0.20 parts by weight of carbon black pigment obtained as Cabot Black Pearls 120, 0.063 parts by weight of the curing inhibitor 4-t-butylcatechol, 9.60 parts by weight of ethoxylated(2) bisphenol A dimethacrylate obtained as Sartomer SR348, 1.694 parts by weight functionalized poly(arylene ether), 0.85 parts by weight of poly(styrene-maleic anhydride) copolymer, 0.40 parts by weight of the mold release agent stearic acid, and 0.378 parts by weight of the curing initiator t-butyl peroxybenzoate.

The curable compositions were prepared as follows. The functionalized poly(arylene ether), acryloyl monomer, and curing inhibitor were mixed to form a slurry. The slurry was heated in a 250 mL beaker to 170° C. with agitation for about

TABLE 5

|  | C. Ex. 6 | C. Ex. 7 | Ex. 24 | C. Ex. 8 | C. Ex. 9 |
|---|---|---|---|---|---|
| PPE methacrylate functionality | — | 1 | 2 | 0 | 1 |
| PPE IV (dL/g) | — | 0.12 | 0.12 | 0.30 | 0.30 |
| Flexural Strength (MPa) | 87.4 ± 10.0 | 88.7 ± 6.4 | 103.4 ± 6.3 | 68.2 ± 16.9 | 111.7 ± 8.6 |
| Flexural Modulus (GPa) | 3.07 ± 0.13 | 3.04 ± 0.04 | 2.95 ± 0.04 | 3.01 ± 0.04 | 2.86 ± 0.05 |
| Break Strain (%) | 3.03 ± 0.35 | 3.07 ± 0.27 | 3.91 ± 0.34 | 2.36 ± 0.65 | 4.58 ± 0.56 |
| Break Energy (J) | 0.53 ± 0.12 | 0.56 ± 0.10 | 0.93 ± 0.16 | 0.34 ± 0.19 | 1.18 ± 0.56 |
| Critical Stress Intensity (MPa·m$^{0.5}$) | 0.26 ± 0.04 | 0.41 ± 0.09 | 0.38 ± 0.09 | 0.64 ± 0.09 | 0.56 ± 0.04 |

EXAMPLES 25 AND 26

COMPARATIVE EXAMPLES 10-12

Five samples were prepared, varying in the type of functionalized poly(arylene ether) resin. Example 25 used a 13 minutes, at which point the styrene-maleic anhydride copolymer was added and heating was continued for another two minutes to produce a clear solution. The solution was cooled to about 130° C., and other soluble components except the initiator were added. After further cooling to 90° C., the curing initiator was added with thorough mixing, followed by addition and mixing of all remaining components. Compositions were compounded by feeding them into a Brabender mixer equipped with "roller" blades, operated at 60 rpm. The mixer was maintained at 80° C. to soften the composition and facilitate filler wetting. The total compounding time was about 5 minutes. Compounded compositions were cooled and stored in airtight containers before use.

Spiral flow was measured at 150° C. and 6.89 megapascals according to SEMI G11-88, "Recommended practice for ram follower gel time and spiral flow of thermal setting molding compounds." Flexural strength, flexural modulus, and flexural elongation to break were measured at 23° C. according to ASTM D790.

Moisture absorption was measured according to a modified version of SEMI G66-96, "Test Method for the measurement of water absorption characteristics for semiconductor plastic molding compounds." The moisture absorption characteristics were determined by measuring the net weight gain on conditioning samples in a 85° C. and 85% relative humidity for 168 hours. Equipment used for the test included an environmental chamber maintained at 85° C./85% RH; an analytical balance capable of ±0.0001 g accuracy; an oven capable of maintaining 110±3° C.; desiccators to contain samples during cool-down from oven drying; a "humid box" to contain samples during cool-down from moisture conditioning (a desiccator from which desiccant was removed and water added); and sample holders to hold samples during oven drying and moisture conditioning.

Samples were prepared via a standard transfer molding process for preparing "Izod" bars, i.e. using a 63.5 mm×12.7 mm×3.2 mm (2.5"×0.5"×⅛") mold cavity. These sample dimensions differ from the SEMI standard for ease of molding (SEMI recommends the use of 50 mm×1 mm disks). At least four specimens per compound were used. The samples were post-cured for 2 hours at 175° C.

In order to determine a base "dry" weight, molded, post-cured bars were dried in an oven at 110° C. for one hour. Samples are then taken out of the oven and placed in a desiccator to cool to room temperature. The cooled samples were weighed using an analytical balance to the nearest 0.0001 gram. This weight is $W_1$, the dry weight of the sample.

After the dry weight was measured, the samples were placed in an environmental chamber maintained at 85° C./85% RH for 168 hours (one week). At the end of the conditioning period, the samples were removed from the environmental chamber and placed in the "humid box", to prevent moisture loss during cool-down and weighing. Samples were removed from the box one at a time to be weighed. Any condensed moisture was wiped off with a lint-free cloth or equivalent. The specimens were then reweighed to the nearest 0.0001 gram, to yield $W_2$, the weight after humidity conditioning.

The moisture absorption was calculated as follows:

$$\text{Weight gain, \%} = 100 \times \frac{(W_2 - W_1)}{W_1}.$$

Jetting behavior was studied using short-shots injected into a standard 4-cavity tool designed to mold specimens for Izod testing. A 12-gram shot was injected into the tool and the behavior of the flow front was noted. Materials exhibiting a smooth flow front, showing little or no indication of a finger-like jet, were considered non-jetting. Jetting was qualitatively rated on a scale of 0 (no jetting) to 5 (severe jetting).

Thermomechanical analysis was used to determine the coefficient of thermal expansion (CTE) and the glass transition ($T_g$). The procedure outlined in SEMI G13-88 was used. Molded and post-cured samples measuring at least 3 millimeters in each dimension were cut to a size of approximately 3 mm×3 mm×3 mm, noting the direction of measurement (flow direction, perpendicular to flow plane, etc.).

An initial force of 0.05 Newtons was used. The measurements were made under a nitrogen atmosphere at 100 ml/min. The heating program was as follows:

1: Equilibrate at 25° C.
2: Isothermal for 1 min
3: Ramp 5° C./min to 250° C.
4: Isothermal for 1 min
5: Ramp 5° C./min to 0° C.
6: Equilibrate at 0° C.
7: Isothermal for 1 min
8: Ramp 5° C./min to 250° C.

The second heat cycle was used to calculate CTE and $T_g$.

Compositions and results are given in Table 6. The results show that Examples 25 and 26, with low molecular weight dicapped poly(arylene ether), exhibit reduced (improved) jetting and increased spiral flow versus Comparative Examples 10 and 11 with high molecular weight monocapped poly(arylene ether). This improvement was achieved without compromising moisture absorption, CTE, or $T_g$ values.

When the results of these experiments are considered along with those above, it is clear that the use of low molecular weight dicapped poly(arylene ether) enables a previously unattainable combination of high spiral flow, low jetting, high compatibility with the olefinically unsaturated monomer, and low shrinkage. When either the molecular weight or the degree of functionalization is changed, at least one of these properties is compromised.

TABLE 6

|  | Ex. 25 | Ex. 26 | C. Ex. 10 | C. Ex. 11 | C. Ex. 12 |
|---|---|---|---|---|---|
| PPE methacrylate functionality | 2 | 2 | 1 | 1 | 1 |
| PPE $M_n$ (AMU) | 3,111 | 5,712 | 17,814 | 12,869 | 4,176 |
| PPE $M_w$ (AMU) | 5,838 | 16,997 | 37,474 | 26,311 | 7,631 |
| spiral flow (cm) | 52.3 ± 0.6 | 45.4 ± 2.0 | 27.5 ± 1.3 | 38.8 ± 0.8 | 52.2 ± 1.6 |
| moisture absorption (%) | 0.243 ± 0.004 | 0.241 ± 0.005 | 0.258 ± 0.012 | 0.256 ± 0.002 | 0.237 ± 0.007 |
| Jetting rating | 1 | 3 | 5 | 5 | 1 |
| CTE below $T_g$ (ppm/° C.) | 10 | 7 | 9 | 11 | 13 |

TABLE 6-continued

|  | Ex. 25 | Ex. 26 | C. Ex. 10 | C. Ex. 11 | C. Ex. 12 |
|---|---|---|---|---|---|
| CTE above $T_g$ (ppm/°C.) | 40 | 38 | 37 | 44 | 39 |
| Tg (°C.) | 121 | 112 | 132 | 117 | 128 |

EXAMPLES 27-30

COMPARATIVE EXAMPLE 13

These examples demonstrate the efficacy of adhesion promoters in improving the adhesion of the composition to copper foil. Five compositions were prepared differing in the type and amount of adhesion promoter. Comparative Example 13 had no adhesion promoter. Example 27 included 1.17 weight percent of zinc diacrylate obtained from Sartomer as SR705. Example 28 included 1.17 weight percent of styrene-maleic anhydride copolymer obtained from Sartomer as SMA EF30. Example 29 included 1.17 weight percent of a partially acrylated epoxy oligomer obtained from Surface Specialties/UCB as EBECRYL® 3605. Example 30 included 1.125 weight percent of a 3:1 weight/weight mixture of the diglycidyl ether of bisphenol A and methylene dianiline, obtained from Resolution Chemicals and Aldrich, respectively. All compositions included a silane-treated silica prepared from Denka essentially spherical fused silica and methacryloxypropyltrimethoxysilane obtained from Aldrich; colorant (either carbon black or dye), a mold release wax (LICOWAX® OP from Clariant); a flame retardant (MELAPUR® 200 from Ciba Specialty Chemicals or OP1311 from Clariant); dicumyl peroxide initiator; 4-t-butylcatechol inhibitor; the acryloyl monomer ethoxylated bisphenol A dimethacrylate (obtained as SR348 from Sartomer); and a methacrylate monocapped poly(2,6-dimethyl-1,4-phenylene ether) resin (PPO-MA) having an intrinsic viscosity of about 0.3 dL/g. Complete compositions are provided in Table 7.

The following general procedure was used to prepare the curable compositions. The monomer, inhibitor and powdered PPO-MA (sieved to −35 mesh) were mixed together to form a slurry. The mixture thus obtained, contained in a 250 mL beaker, was placed in an oil bath maintained at ca. 170° C. A stirrer immersed in the slurry provided mixing. The mixture was heated with stirring for approximately 15 minutes, until the solution turned clear. Adhesion promoters such as the zinc diacrylate, partially acrylated epoxy oligomer and the styrene-maleic anhydride were added toward the end of the dissolution process. The resulting mixture was taken out of the oil bath and cooled in air to room temperature.

The resulting resin mixture was compounded, along with the other constituents (treated silica, flame retardant, wax, initiator, carbon black pigment) using a Brabender mixer. The resin-filler mixture was fed into the Brabender mixer equipped with "roller" blades, operated at 60 rpm. The mixer was maintained at 80° C. to soften/liquefy the resin and enable filler wetting. A total mixing time of about 5 minutes was used. The compound was then removed from the mixer, cooled and stored in airtight containers.

Adhesion to copper substrate was measured according to SEMI G69-0996, "Test Method for measurement of adhesive strength between leadframes and molding compounds". The "pull" method was used, with a 5-mil thick copper substrate transfer-molded at 155° C. (175° C. for Example 30) into a block of molding compound 2.8 mm thick. The copper substrate used was EFTEC 64T ½ H grade from Furukawa. The adhesive area (the triangular portion of the copper that is molded into the molding compound) was ca. 15.2 mm², including both sides. The molded specimens were annealed/post-cured at 175° C. for 2 hours. They were conditioned at room temperature for approximately 24 hours prior to testing. The adhesion of the mold compound to copper was tested by pulling the copper "tab" out of the mold compound using an Instron tensile tester at the rate of 2 millimeters/minute. The peak load was recorded and reported as the adhesive strength. The peak load was measured and reported in pounds, with one pound being equivalent to 0.297 MPa of interfacial shear strength, assuming a nominal adhesive area of 15.2 mm². The means and standard deviations expressed for tab pull adhesion values represent determinations on at least six samples per composition.

The results, provided in Table 7, show that each of the adhesion promotes was effective to substantially increase the tab pull adhesion between the cured composition and copper foil.

TABLE 7

|  | C. Ex. 13 | Ex. 27 | Ex. 28 | Ex. 29 | Ex. 30 |
|---|---|---|---|---|---|
| Silane-treated silica | 85.6 | 85.6 | 85.6 | 85.6 | 85 |
| Carbon black | 0.2 | 0.2 | 0.2 | 0.2 | — |
| Keystone green dye | — | — | — | — | 0.045 |
| Mold release wax | 0.4 | 0.4 | 0.4 | 0.4 | 0.39 |
| Melapur 200 | 1.66 | 1.66 | 1.66 | 1.66 | — |
| OP1311 | — | — | — | — | 1.35 |
| Dicumyl peroxide | 0.364 | 0.364 | 0.364 | 0.364 | 0.45 |
| Zinc diacrylate | — | 1.17 | — | — | — |
| Styrene-maleic anhydride copolymer | — | — | 1.17 | — | — |
| Partially acrylated epoxy oligomer | — | — | — | 1.17 | — |
| Epoxy/amine mixture | — | — | — | — | 1.125 |
| 4-t-Butylcatechol | 0.061 | 0.061 | 0.061 | 0.061 | 0.027 |

TABLE 7-continued

|  | C. Ex. 13 | Ex. 27 | Ex. 28 | Ex. 29 | Ex. 30 |
| --- | --- | --- | --- | --- | --- |
| Ethoxylated BPA dimethacrylate | 9.96 | 8.97 | 8.97 | 8.97 | 9.51 |
| MA-PPO | 1.76 | 1.58 | 1.58 | 1.58 | 2.10 |
| Tab pull adhesion (pounds) | 12.1 ± 6.9 | 41.5 ± 16.3 | 28.6 ± 10.1 | 35.6 ± 11.4 | 46.9 ± 3.9 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A curable composition, comprising:
a difunctionalized poly(arylene ether) having an intrinsic viscosity of 0.05 to 0.30 deciliter per gram at 25° C.; wherein the difunctionalized poly(arylene ether) has the structure

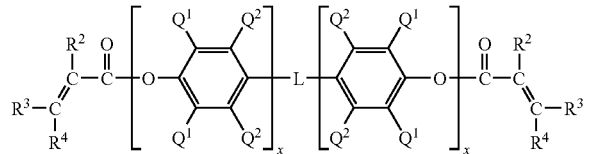

wherein each occurrence of $Q^1$ is independently selected from the group consisting of halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; each occurrence of $Q^2$ is independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; each occurrence of x is independently 1 to 100;

each occurrence of $R^2$-$R^4$ is independently hydrogen or $C_1$-$C_{18}$ hydrocarbyl; and L has the structure

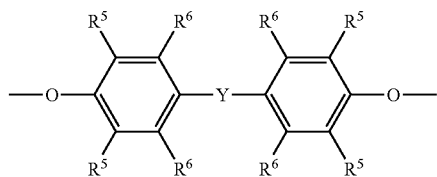

wherein each occurrence of $R^5$ and $R^6$ is independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; and Y has the structure

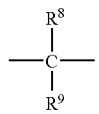

wherein each occurrence of $R^8$ and $R^9$ is independently selected from the group consisting of hydrogen and $C_1$-$C_{12}$ hydrocarbyl; and an olefinically unsaturated monomer.

2. The curable composition of claim 1, wherein the difunctionalized poly(arylene ether) has the structure

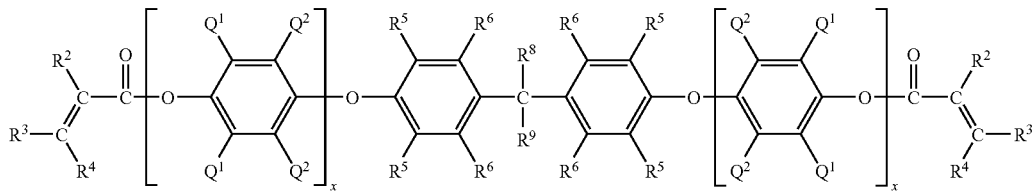

wherein $Q^1$ is methyl; each occurrence of $Q^2$ is independently hydrogen or methyl; each occurrence of $R^2$ is independently hydrogen or methyl; $R^3$ and $R^4$ are hydrogen; each occurrence of $R^5$ and $R^6$ is independently selected from the group consisting of hydrogen, halogen, primary or secondary $C_1$-$C_{12}$ alkyl, $C_2$-$C_{12}$ alkenyl, $C_2$-$C_{12}$ alkynyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, and $C_2$-$C_{12}$ halohydrocarbyloxy wherein at least two carbon atoms separate the halogen and oxygen atoms; $R^8$ and $R^9$ are independently hydrogen or $C_1$-$C_6$ hydrocarbyl; and each occurrence of x is 1 to 100.

3. The curable composition of claim 1, wherein the difunctionalized poly(arylene ether) has the structure

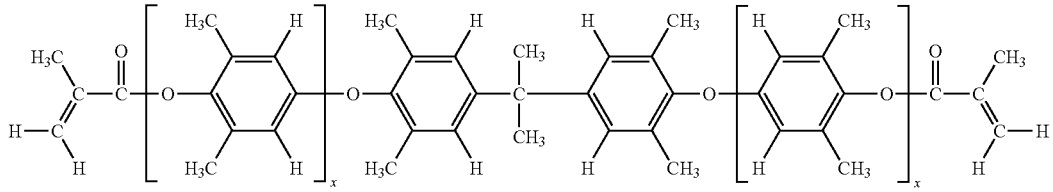

wherein each occurrence of x is 1 to 100.

4. The curable composition of claim 1, wherein the difunctionalized poly(arylene ether) is the product of oxidative copolymerization of a monohydric phenol and a dihydric phenol.

5. The curable composition of claim 4, wherein the monohydric phenol is selected from the group consisting of 2,6-dimethylphenol, 2,3,6-trimethylphenol, and mixtures thereof; and wherein the dihydric phenol is selected from the group consisting of 1,1-bis(4-hydroxyphenyl)ethane, 2,2-bis(4-hydroxyphenyl)propane 2,2-bis(4-hydroxyphenyl)butane, 2,2-bis(4-hydroxyphenyl)octane, 1,1-bis(4-hydroxyphenyl)propane, 1,1-bis(4-hydroxyphenyl)-n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-2,6-dimethylphenyl)propane, 2,2-bis(4-hydroxy-3-bromophenyl)propane, and mixtures thereof.

6. The curable composition of claim 1, wherein the difunctionalized poly(arylene ether) has an intrinsic viscosity of 0.08 to 0.20 deciliters per gram.

7. The curable composition of claim 1, wherein the difunctionalized poly(arylene ether) has a number average molecular weight of 1,000 to 10,000 atomic mass units (AMU), with the provisos that less than 10 weight percent of the difunctionalized poly(arylene ether) has a number average molecular weight less than 500 AMU, and less than 25 weight percent of the difunctionalized poly(arylene ether) has a number average molecular weight less than 1,000 AMU.

8. The curable composition of claim 1, wherein the difunctionalized poly(arylene ether) has a number average molecular weight of at least 10,000 AMU, with the provisos that less than 2 weight percent of the difunctionalized poly(arylene ether) has a number average molecular weight less than 500 AMU, and less than 5 weight percent of the difunctionalized poly(arylene ether) has a number average molecular weight less than 1,000 AMU.

9. The curable composition of claim 1, wherein the olefinically unsaturated monomer is selected from the group consisting of alkenyl aromatic monomers, allylic monomers, acryloyl monomers, vinyl ethers, maleimides, and mixtures thereof.

10. The curable composition of claim 1, wherein the olefinically unsaturated monomer comprises an acryloyl monomer having at least two acryloyl moieties.

11. The curable composition of claim 1, wherein the olefinically unsaturated monomer comprises an acryloyl monomer selected from the group consisting of trimethylolpropane tri(meth)acrylate,1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, methacryloxypropyl trimethoxysilane, ethoxylated (2) bisphenol A di(meth)acrylate, and mixtures thereof.

12. The curable composition of claim 1, wherein the olefinically unsaturated monomer comprises cyclohexanedimethanol di(meth)acrylate.

13. The curable composition of claim 1, comprising 5 to 90 parts by weight of the difunctionalized poly(arylene ether) and 10 to 95 parts by weight of the olefinically unsaturated monomer per 100 parts by weight total of the difunctionalized poly(arylene ether) and the olefinically unsaturated monomer.

14. The curable composition of claim 1, further comprising an adhesion promoter selected from the group consisting of metal (meth)acrylate salts, combinations of an aromatic epoxy compound and an aromatic amine, copolymers of a vinyl aromatic compound and an α,β-unsaturated cyclic anhydride, partially (meth)acrylated epoxy compounds, and mixtures thereof.

15. The curable composition of claim 14, wherein the adhesion promoter comprises a styrene-maleic anhydride copolymer.

16. The curable composition of claim 1,
wherein the difunctionalized poly(arylene ether) has an intrinsic viscosity of 0.08 to 0.25 deciliter per gram at 25° C.;
wherein the olefinically unsaturated monomer comprises an acryloyl monomer comprising at least two acryloyl moieties; and
wherein the curable composition further comprises a cure initiator selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di (t-butylperoxy) hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and mixtures thereof.

17. The curable composition of claim 1,
wherein the curable composition comprises 5 to 90 parts by weight of the difunctionalized poly(arylene ether);
wherein the difunctionalized poly(arylene ether) has an intrinsic viscosity of 0.08 to 0.20 deciliter per gram at 25° C.;
wherein the difunctionalized poly(arylene ether) has the structure

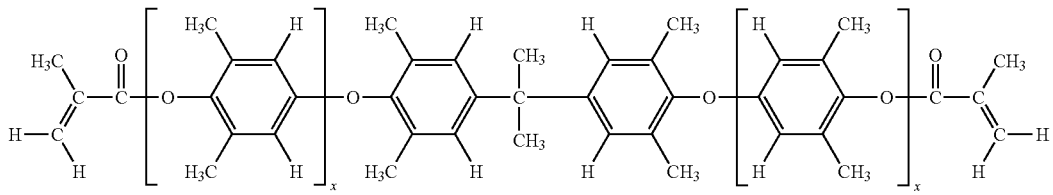

wherein each occurrence of x is 1 to 50;
wherein the curable composition comprises 5 to 90 parts by weight of the olefinically unsaturated monomer;
wherein olefinically unsaturated monomer is an acryloyl monomer selected from the group consisting of trimethylolpropane tri(meth)acrylate, 1,6-hexanediol di(meth)acrylate, neopentyl glycol di(meth)acrylate, ethylene glycol di(meth)acrylate, propylene glycol di(meth)acrylate, cyclohexanedimethanol di(meth)acrylate, butanediol di(meth)acrylate, diethylene glycol di(meth)acrylate, triethylene glycol di(meth)acrylate, isobornyl (meth)acrylate, methyl (meth)acrylate, methacryloxypropyl trimethoxysilane, ethoxylated (2) bisphenol A di(meth)acrylate, and mixtures thereof; and
wherein the curable composition comprises 0.2 to 5 part by weight of a curing initiator selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, α,α'-bis(t-butylperoxy-m-isopropyl)benzene, 2,5-dimethyl-2,5-di(t-butylperoxy) hexane, di(t-butylperoxy) isophthalate, t-butylperoxy benzoate, 2,2-bis(t-butylperoxy)butane, 2,2-bis(t-butylperoxy)octane, 2,5-dimethyl-2,5-di (benzoylperoxy) hexane, di(trimethylsilyl)peroxide, trimethylsilylphenyltriphenylsilyl peroxide, and mixtures thereof;
wherein all parts by weight are based on 100 parts by weight total of the difunctionalized poly(arylene ether) and the acryloyl monomer.

18. The curable composition of claim 17, wherein the acryloyl monomer comprises cyclohexanedimethanoldi(meth)acrylate.

19. A cured composition, comprising the reaction products obtained by curing the curable composition of claim 1.

20. An article comprising the cured composition of claim 19.

21. The curable composition of claim 1, wherein the olefinically unsaturated monomer is selected from the group consisting of 2-methylstyrene, 3-methylstyrene, 4-methylstyrene, 2-t-butylstyrene, 3-t-butylstyrene, 4-t-butylstyrene, and combinations thereof.

22. The curable composition of claim 1, wherein the olefinically unsaturated monomer comprises 4-t-butylstyrene.

* * * * *